United States Patent
Jeong et al.

(10) Patent No.: US 11,131,499 B2
(45) Date of Patent: *Sep. 28, 2021

(54) VALVE ASSEMBLY AND REFRIGERATOR HAVING THE SAME

(71) Applicant: Samsung Electronics Co., Ltd., Suwon-si (KR)

(72) Inventors: Jin Jeong, Yongin-si (KR); Kyoung Ki Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,297

(22) Filed: Jan. 22, 2020

(65) Prior Publication Data
US 2020/0158421 A1   May 21, 2020

Related U.S. Application Data

(63) Continuation of application No. 15/641,615, filed on Jul. 5, 2017, now Pat. No. 10,551,112.

(30) Foreign Application Priority Data

Jul. 19, 2016   (KR) .................. 10-2016-0091143

(51) Int. Cl.
*F25D 23/12*   (2006.01)
*F16K 7/02*   (2006.01)
(Continued)

(52) U.S. Cl.
CPC ......... *F25D 23/126* (2013.01); *B67D 1/0014* (2013.01); *B67D 1/1256* (2013.01);
(Continued)

(58) Field of Classification Search
CPC ... F25D 23/126; B67D 1/0014; B67D 1/1256; B67D 2001/0093; F16K 7/02; F16K 21/04; F16K 7/07
(Continued)

(56) References Cited

U.S. PATENT DOCUMENTS 1,657,663 A * 1/1928 Devereux ................. F16K 7/02
                                                      138/45
2,328,382 A   8/1943 Langdon
(Continued)

FOREIGN PATENT DOCUMENTS

CN         1646380        7/2005
CN       104833156        8/2015
(Continued)

OTHER PUBLICATIONS

Extended European Search Report dated Nov. 20, 2017 in European Patent Application No. 17179370.6.
(Continued)

*Primary Examiner* — Paul R Durand
*Assistant Examiner* — Randall A Gruby
(74) *Attorney, Agent, or Firm* — Staas & Halsey LLP

(57) ABSTRACT

A refrigerator includes a main body, a dispenser configured to supply water to the outside of the main body, a water supply flow path connecting the dispenser to a water source; and a valve assembly disposed on the water supply flow path, wherein the valve assembly comprises an elastic member having an outlet whose diameter is reduced by an elastic force, when water is no longer supplied to the valve assembly, so that water remaining in the inside of the water supply flow path is kept by the surface tension of the water.

7 Claims, 24 Drawing Sheets

(51) Int. Cl.
  *B67D 1/00* (2006.01)
  *B67D 1/12* (2006.01)
  *F16K 21/04* (2006.01)
  *F25C 5/20* (2018.01)
(52) U.S. Cl.
  CPC ............... *F16K 7/02* (2013.01); *F16K 21/04* (2013.01); *B67D 2001/0093* (2013.01); *F25C 5/22* (2018.01); *F25C 2400/14* (2013.01); *F25C 2500/06* (2013.01)
(58) Field of Classification Search
  USPC .......................................................... 251/5
  See application file for complete search history.

(56) References Cited

U.S. PATENT DOCUMENTS

| | | | |
|---|---|---|---|
| 2,593,315 A | 4/1952 | Kraft | |
| 2,721,008 A | 10/1955 | Morgan, Jr. | |
| 2,728,355 A | 12/1955 | Dahl | |
| 2,735,642 A | 2/1956 | Norman | |
| 2,764,183 A | 9/1956 | Gollehon | |
| 2,781,058 A | 2/1957 | Warhus | |
| 2,878,836 A | 3/1959 | Binks | |
| 2,891,578 A | 6/1959 | Erickson | |
| 2,899,979 A * | 8/1959 | Dahl | F16L 55/04 138/45 |
| 2,941,544 A | 6/1960 | Péras | |
| 2,948,297 A | 8/1960 | Langdon | |
| 3,017,903 A | 1/1962 | Steffens | |
| 3,116,747 A | 1/1964 | Cowles | |
| 3,141,477 A | 7/1964 | Campbell | |
| 3,346,001 A * | 10/1967 | Camp | E03C 1/104 137/218 |
| 3,566,902 A | 3/1971 | Muller | |
| 3,685,786 A * | 8/1972 | Woodson | F16K 47/06 251/4 |
| 3,837,363 A * | 9/1974 | Meronek | B05B 1/3006 138/45 |
| 3,837,381 A | 9/1974 | Arroyo | |
| 4,105,050 A * | 8/1978 | Hendrickson | B05B 1/3006 137/517 |
| 4,218,014 A | 8/1980 | Tracy | |
| 4,228,956 A | 10/1980 | Varner | |
| 4,256,242 A | 3/1981 | Christine | |
| 4,492,339 A | 1/1985 | Kreitzberg | |
| 4,513,885 A | 4/1985 | Hogan | |
| 4,609,014 A | 9/1986 | Jurjevic | |
| 5,141,029 A | 8/1992 | Naugle | |
| 5,316,261 A | 5/1994 | Stoner | |
| 5,340,080 A | 8/1994 | Cleland | |
| 5,348,048 A | 9/1994 | Schirado | |
| 5,373,964 A | 12/1994 | Moore | |
| 5,890,518 A | 4/1999 | Fischerkeller | |
| 7,225,829 B2 | 6/2007 | Bailey | |
| 7,237,619 B2 * | 7/2007 | Mehr | A62C 31/02 137/849 |
| 7,635,357 B2 | 12/2009 | Mayer | |
| 7,677,417 B2 | 3/2010 | Leiner | |
| 8,985,395 B2 | 3/2015 | Tansey | |
| 9,016,526 B2 | 4/2015 | Evans | |
| 2003/0205585 A1 | 11/2003 | Mitchell et al. | |
| 2006/0219739 A1 | 10/2006 | Crisp, III | |
| 2007/0068969 A1 | 3/2007 | Orzech | |
| 2008/0118378 A1 | 5/2008 | Baron | |
| 2011/0030412 A1 | 2/2011 | Kim | |
| 2014/0190250 A1 | 7/2014 | Zimmerman | |
| 2015/0217984 A1 | 8/2015 | Orita | |
| 2015/0329343 A1 | 11/2015 | Kleinrchert | |
| 2017/0350640 A1 | 12/2017 | Pae | |

FOREIGN PATENT DOCUMENTS

| | | |
|---|---|---|
| DE | 102005057163 | 5/2007 |
| EP | 0380251 | 8/1990 |
| EP | 2179961 | 4/2010 |
| JP | 2006-275313 | 10/2006 |
| JP | 4169115 | 8/2008 |
| KR | 10-0738599 | 7/2007 |
| KR | 10-2010-0040632 | 4/2010 |

OTHER PUBLICATIONS

Chinese Office Action dated Nov. 13, 2018 in Chinese Patent Application No. 201710584696.0.
Chinese Office Action dated Jun. 20, 2019 in Chinese Patent Application No. 201710584696.
U.S. Office Action dated Jul. 11, 2018 in U.S. Appl. No. 15/641,615.
U.S. Office Action dated Nov. 16, 2018 in U.S. Appl. No. 15/641,615.
U.S. Notice of Allowance dated Sep. 30, 2019 in U.S. Appl. No. 15/641,615.
U.S. Appl. No. 15/641,615, filed Jul. 5, 2017, Jin Jeong, et al., Samsung Electronics Co., Ltd.

* cited by examiner

VALVE ASSEMBLY AND REFRIGERATOR HAVING THE SAME

CROSS-REFERENCE TO RELATED APPLICATION

This application is a continuation application of U.S. patent application Ser. No. 15/641,615, filed on Jul. 5, 2017, which claims the benefit of the Korean Patent Application No. 10-2016-0091143, filed on Jul. 19, 2016, in the Korean Intellectual Property Office, the disclosures of which are incorporated herein by reference.

BACKGROUND

1. Field

Embodiments of the present disclosure relate to a valve assembly and a refrigerator having the valve assembly, and more particularly, a valve assembly capable of preventing residual water in the valve assembly from flowing down when water is shut off, and a refrigerator having the valve assembly.

2. Description of the Related Art

Generally, a refrigerator has a storage room for storing food and a cooler for supplying cool air to the storage room to keep the food freshly. In response to user needs, many refrigerators are provided with an ice bucket for making ice and a dispenser for enabling a user to receive water or ice without having to open the door.

The dispenser receives water from an external water source, and supplies the water to the outside of the refrigerator so that the user does not have to open the door to receive water. More specifically, water is supplied to the dispenser from an external water source by the water pressure of the external water source and the control of a valve.

A control valve is provided on a water supply flow path for the dispenser which connects the dispenser to the external water source to prevent water remaining in the water supply flow path for the dispenser from flowing to the outside of the dispenser when water supply to the dispenser is stopped. However, since the control valve blocks an outlet physically to control remaining water, the control valve requires separate electrical components and signaling devices, which leads to an increase of manufacturing cost.

SUMMARY

One aspect of the present disclosure discloses a valve assembly capable of controlling water remaining in a water supply flow path for a dispenser through a relatively simple configuration, and a refrigerator having the valve assembly.

It is another aspect of the present disclosure discloses a valve assembly capable of controlling water remaining in a water supply flow path for a dispenser depending on whether water is supplied to the valve assembly, without using a separate signaling device, and a refrigerator having the valve assembly.

In accordance with one aspect of the present disclosure, a refrigerator includes a main body, a dispenser configured to supply water to an outside of the main body, a water supply flow path connectable to a water source and configured to connect the dispenser to the water source, and a valve assembly disposed on the water supply flow path, and including an elastic member having an outlet with an inner diameter reducible by an elastic force of the elastic member, when water is not supplied to the valve assembly, so that water remaining in the inside of the water supply flow path is retained by a surface tension of the water.

The valve assembly may be disposed on the water supply flow path adjacent to the dispenser.

When water is supplied through the dispenser, the inner diameter of the outlet is expanded by the water pressure.

The elastic member may include an expansion groove formed in an outer circumference of the outlet.

The valve assembly may further include a protecting member configured to accommodate the elastic member in the protecting member.

The elastic member may be disposed to form an air gap between the elastic member and the protecting member.

The protecting member may include a through hole penetrating an inside and an outside of the protecting member.

An outer surface of the elastic member may be in contact with an inner surface of the protecting member.

The elastic member may include a supporting portion protruding toward the protecting member.

The supporting portion may include a supporting protrusion formed at a central portion of the elastic member.

The supporting portion may include a plurality of supporting protrusions disposed along a longitudinal direction of the elastic member.

The elastic member may include a fixing protrusion protruding radially outward from an outer circumferential surface of the elastic member, the protecting member may include a fixing groove in which the fixing protrusion is insertable.

The protecting member may include a first protecting member having a first accommodating groove configured to accommodate one portion of the elastic member therein, and a second protecting member having a second accommodating groove rotatably provided on one side of the first protecting member along a longitudinal direction of the first protecting member, and configured to accommodate the remaining portion of the elastic member therein.

The first protecting member may include a coupling protrusion protruding from the other side that is opposite to the side connected to the second protecting member, and the second protecting member may include a coupling groove coupled with the coupling protrusion in a snap-fit manner, at the other side that is opposite to the side connected to the first protecting member.

The first protecting member may include an elastic member fixing portion configured to accommodate a portion of the elastic member therein, and a water supply pipe fixing portion provided on both sides of the elastic member fixing portion, to configured to accommodate a water supply pipe connected to both ends of the valve assembly and the remaining portion of the elastic member, wherein elastic member fixing portion may be rotatable independently from the water pipe fixing portion with respect to the second protecting member.

In accordance with another aspect of the present disclosure, a valve assembly includes a protecting member, a fixing member provided at both ends of the protecting member and detachably connectable to a water supply pipe, and an elastic member accommodated in an inside of the protecting member, and having an outlet with an inner diameter expandable by a fluid pressure of fluid flowing through the elastic member and reducible by an elastic force of the elastic member when the elastic force is greater than the fluid pressure, wherein the diameter of the outlet is reduced so that fluid remaining in the elastic member is retained in the elastic member by a surface tension of the fluid.

The elastic member may include an expansion groove formed on an outer circumference of the outlet.

The fixing member may include a holding member configured to fix the pipe so that the pipe is not separated from the fixing member when the pipe is connected to the fixing member and to release the pipe when the pipe is separated from the fixing member.

In accordance with still another aspect of the present disclosure, a refrigerator includes a main body, a dispenser provided to supply water to an outside of the main body, a water supply flow path connectable to a water source and configured to connect the dispenser to the water source, and a valve assembly disposed adjacent to the dispenser on the water supply flow path, and the valve assembly including an elastic member having an outlet having a first inner diameter when water is not supplied to the valve assembly and a second inner diameter, greater than the first inner diameter when the water is supplied to the valve assembly, and a protecting member configured to accommodate the elastic member therein, wherein the elastic member may include an expansion groove formed in an outer circumference of the outlet.

The protecting member may include a first protecting member having a first receiving groove configured to accommodate one portion of the elastic member, and a second protecting member having a second accommodating groove rotatably coupled with one side of the first protecting member along a longitudinal direction of the first protecting member, and configured to accommodate a remaining portion of the elastic member therein, wherein the first protecting member may be coupled with the second protecting member in a snap-fit manner.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
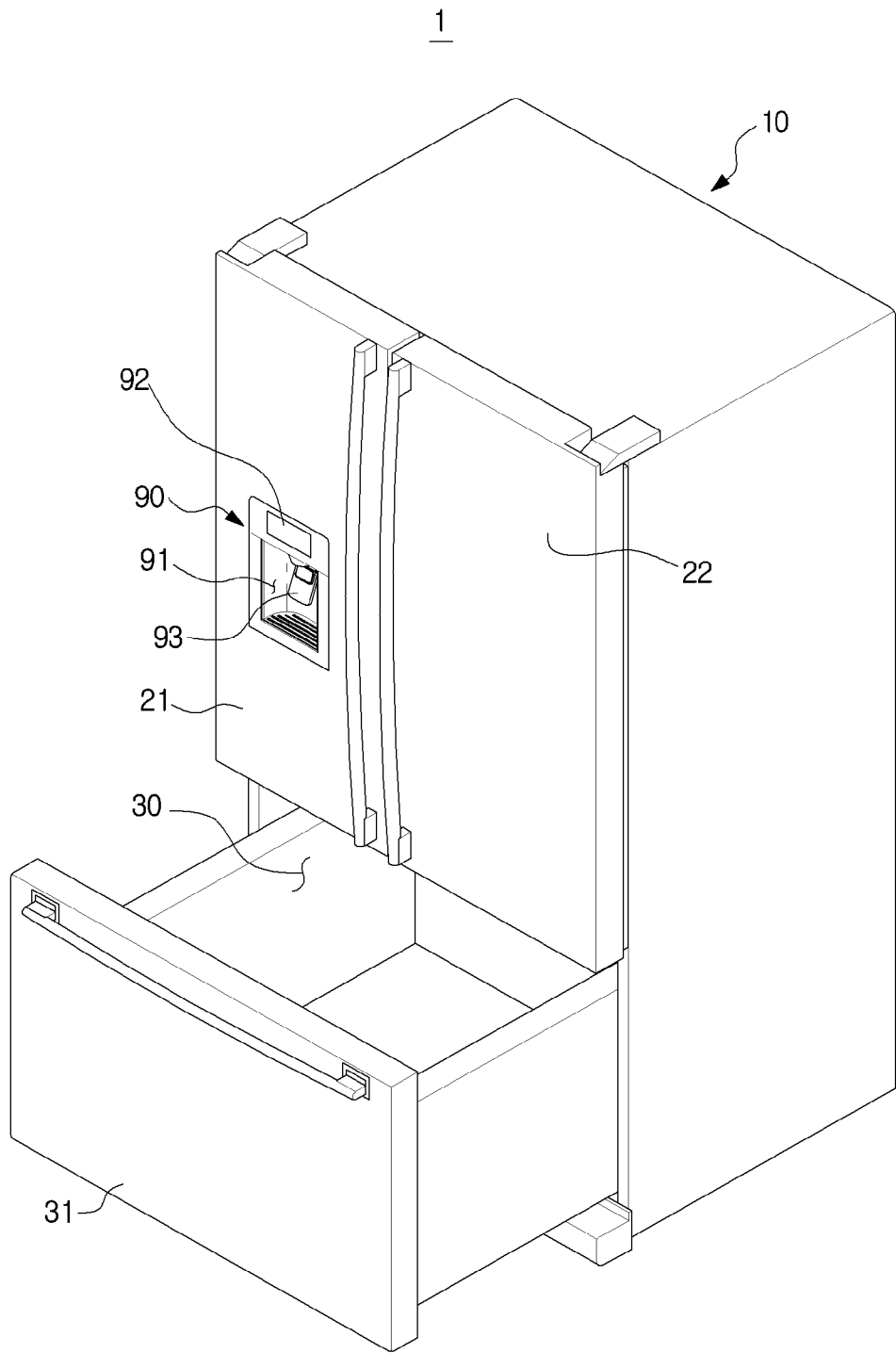
FIG. 1 shows the outer appearance of a refrigerator according to an embodiment of the present disclosure.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols provided in the drawings of the present specification represent members or components that perform the substantially same functions.

The terms used in the present specification are used to describe exemplary embodiments of the present disclosure. Accordingly, it should be apparent to those skilled in the art that the following description of exemplary embodiments of the present disclosure is provided for illustration purpose only and not for the purpose of limiting the present disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, operations, components, or combinations thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

The terms "front-end," "back-end," "upper portion," "lower portion," "upper end," "lower end," and the like used in the following descriptions are defined based on the drawings, and the shape and position of each component are not limited by the terms.

Hereinafter, the embodiments of the present disclosure will be described in detail with reference to the accompanying drawings.

Figure 2:
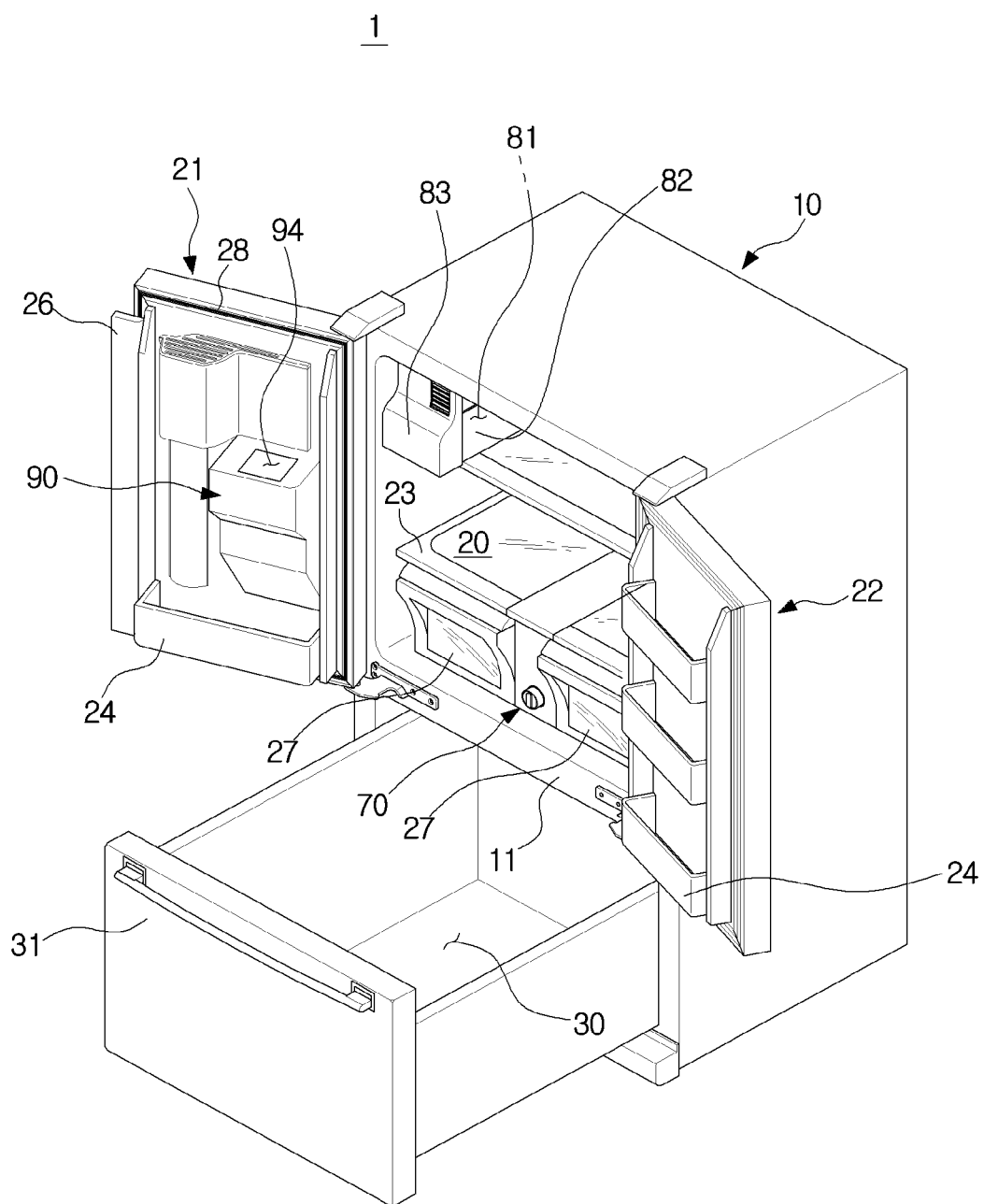
FIG. 2 shows the refrigerator of FIG. 1 when the doors open.
Figure 3:
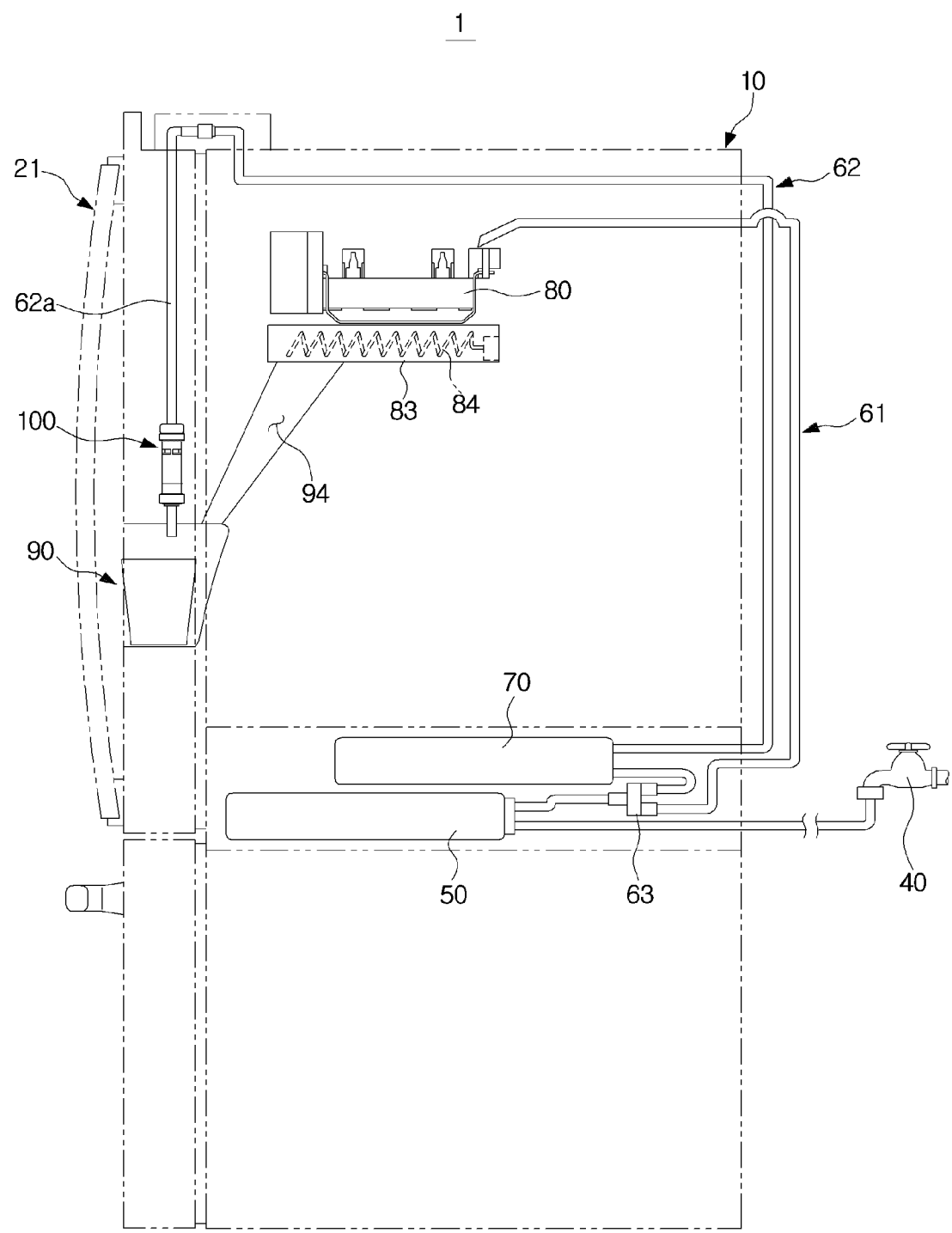
FIG. 3 is a schematic side cross-sectional view of the refrigerator shown in FIG. 1.

FIG. 1 shows the outer appearance of a refrigerator according to an embodiment of the present disclosure, FIG. 2 shows the refrigerator of FIG. 1 when the doors open, and FIG. 3 is a schematic side cross-sectional view of the refrigerator shown in FIG. 1.

Referring to FIGS. 1, 2, and 3, a refrigerator 1 according to an embodiment of the present disclosure may include a main body 10, a storage chambers 20 and 30 formed inside the main body 10, and a cooling apparatus (not shown) to supply cool air to the storage chambers 20 and 30.

The main body 10 may include an inner case forming the storage chambers 20 and 30, an outer case coupled with the inner case to form the outer appearance of the refrigerator 1, and an insulating material (not shown) disposed between the inner case and the outer case to insulate the storage chambers 20 and 30.

The storage chambers 20 and 30 may be partitioned into an upper refrigerating chamber 20 and a lower freezing chamber 30 by an intermediate partition 11. The refrigerating chamber 20 may be maintained at a temperature of about 3° C. to keep food refrigerated, and the freezing chamber 30 may be maintained at a temperature of about 18.5° C. to keep food frozen. The refrigerator chamber 20 may be provided with a shelf 23 to place food on, and at least one storage box 27 to cover food.

An ice-making chamber 81 for making ice may be disposed in the upper corner of the refrigerating chamber 20 in such a way to be partitioned from the refrigerating chamber 20 by an ice-making chamber wall 82. The ice-making chamber 81 may include an ice maker 80 to make ice, an ice bucket 83 to store ice made by the ice maker 80, and an auger 84 to transfer ice stored in the ice bucket 83 to a chute 94.

The refrigerating chamber 20 may include a water tank 70 to store water. The water tank 70 may be disposed between the plurality of storage boxes 27 as shown in FIG. 2, however, the position of the water tank 70 is not limited as long as the water tank 70 is disposed inside the refrigerating chamber 20 so that water stored in the water tank 70 can be cooled by cool air inside the refrigerating chamber 20.

The water tank 70 may be connected to an external water source 40 such as a water pipe, and also may store water purified by a water purifying filter 50. A water supply hose connecting the water tank 70 to the external water source 40 may be a 3-way valve 61.

The refrigerating chamber 20 and the freezing chamber 30 may have open front portions to allow a user to put and take food, the open front portion of the refrigerating chamber 20 may be opened or closed by a pair of rotary doors 21 and 22 hinge-coupled with the main body 10, and the open front portion of the freezing chamber 30 may be opened or closed by a sliding door 31 that can slide with respect to the main body 10. In the rear surfaces of the doors 21 and 22 of the refrigerating chamber 20, a door guard 24 may be disposed to store foods therein.

On the rear edges of the doors 21 and 22, a gasket 28 may be disposed to seal space between the doors 21 and 22 and the main body 10 when the doors 21 and 22 close to prevent cool air in the refrigerating chamber 20 from leaking out. In any one (for example, the door 21) of the doors 21 and 22, a rotating bar 26 may be disposed to seal space between the doors 21 and 22 when the doors 21 and 22 close to prevent cool air in the refrigerating chamber 20 from leaking out.

In any one (for example, the door 21) of the refrigerating chamber doors 21 and 22, a dispenser 90 may be provided to enable the user to take water or ice from the outside of the main body 10 without opening the door 21.

The dispenser 90 may include a water intake space 91 into which the user inserts a container such as a cup to get water or ice, a control panel 92 having an input button for enabling the user to make various settings of the dispenser 90 and a display for displaying various information of the dispenser 90, and an operation lever 93 for enabling the user to operate the dispenser 90 to discharge water or ice.

The dispenser 90 may include a chute 94 connecting the ice maker 80 to the water intake space 91 so that ice made by the ice maker 80 is discharged to the water intake space 91.

The refrigerator 1 may include an ice making water supply flow path 61 connecting the ice maker 80 to the external water source 40 to supply water to the ice maker 80. Water from the external water source 40 may be supplied to the ice maker 80 by the water pressure of the external water source 40 and the control of the 3-way valve 63 which will be described later.

The ice making water supply flow path 61 may pass through a water purifying filter 50. Accordingly, water from the external water source 40 may be purified by the water purifying filter 50 and then supplied to the ice maker 80.

Since the water supplied to the ice maker 80 is cooled by the ice maker 80 even if it is not cooled in the water tank 70, the ice making water supply flow path 61 may not pass through the water tank 70. However, unlike the current embodiment, the ice making water supply flow path 61 may pass through the water tank 70.

The refrigerator 1 may include a water supply flow path 62 for the dispenser 90 connecting the dispenser 90 to the external water source 40 to supply water to the dispenser 90. Water from the external water source 40 may be supplied to the dispenser 90 by the water pressure of the external water source 40 and the control of the 3-way valve 63 which will be described later.

The water supply flow path 62 for the dispenser 90 may pass through the water purifying filter 50. Therefore, water from the external water source 40 may be purified by the water purifying filter 50 and then supplied to the dispenser 90.

The water supply flow path 62 for the dispenser 90 may pass through the water tank 70. Therefore, water from the external water source 40 may be cooled in the water tank 70 and then supplied to the outside through the dispenser 90.

The refrigerator 1 may include a valve assembly 100 disposed adjacent to the dispenser 90 on the water supply flow path 62 for the dispenser 90. When water supply to the dispenser 90 stops, the valve assembly 100 can prevent water remaining in the water supply flow path 62 for the dispenser 90 from flowing to the dispenser 90.

Figure 4:
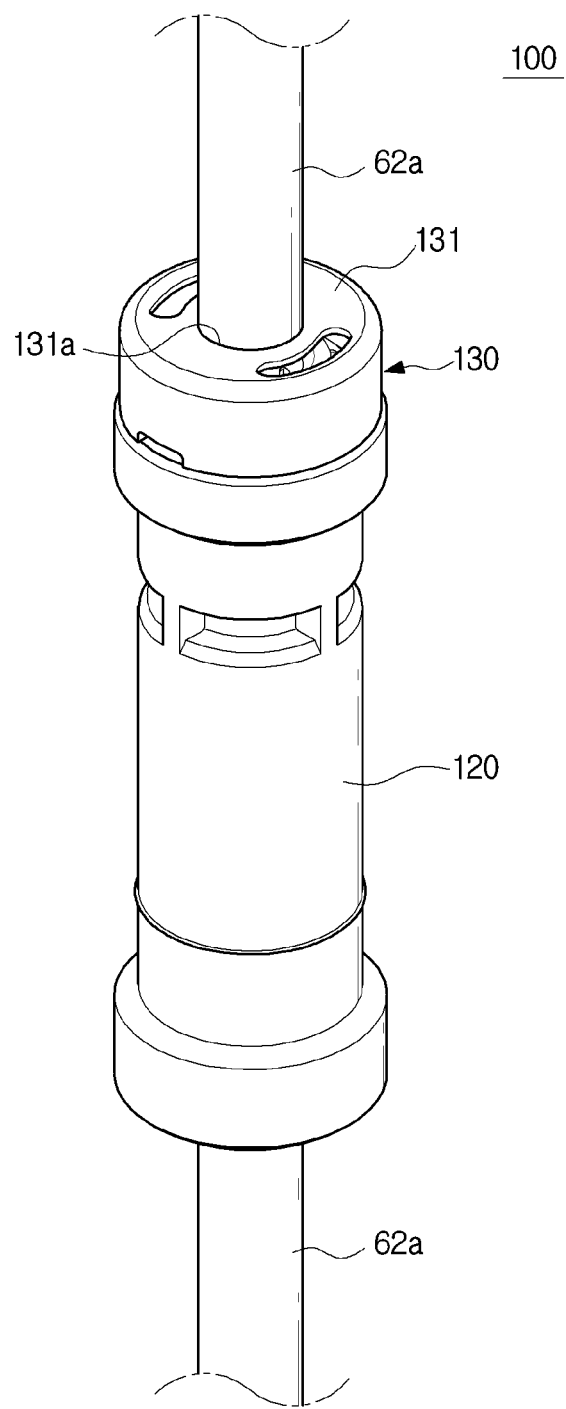
FIG. 4 shows a valve assembly of FIG. 3.
Figure 5:
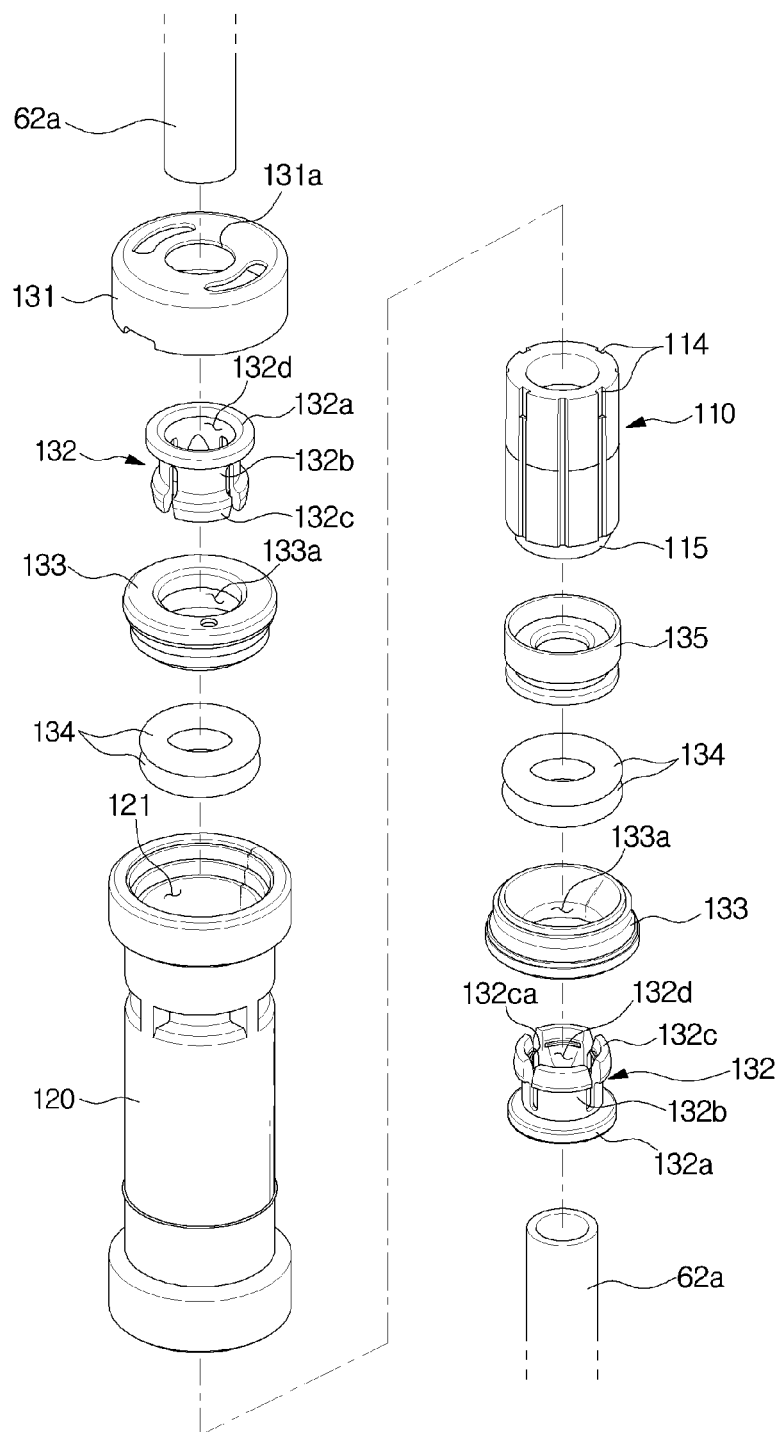
FIG. 5 is an exploded perspective view of the valve assembly shown in FIG. 4.
Figure 6:
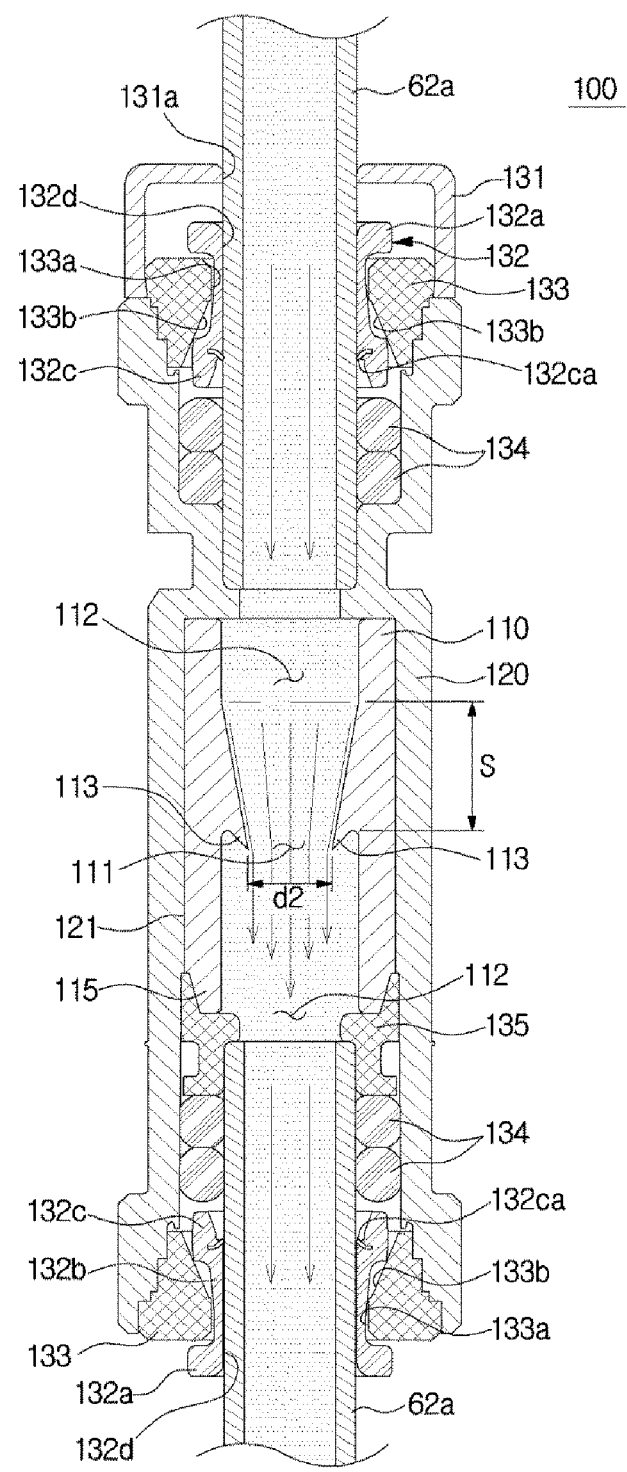
FIG. 6 is a cross-sectional view of the valve assembly shown in FIG. 4 when water is supplied to the valve assembly.
Figure 7:
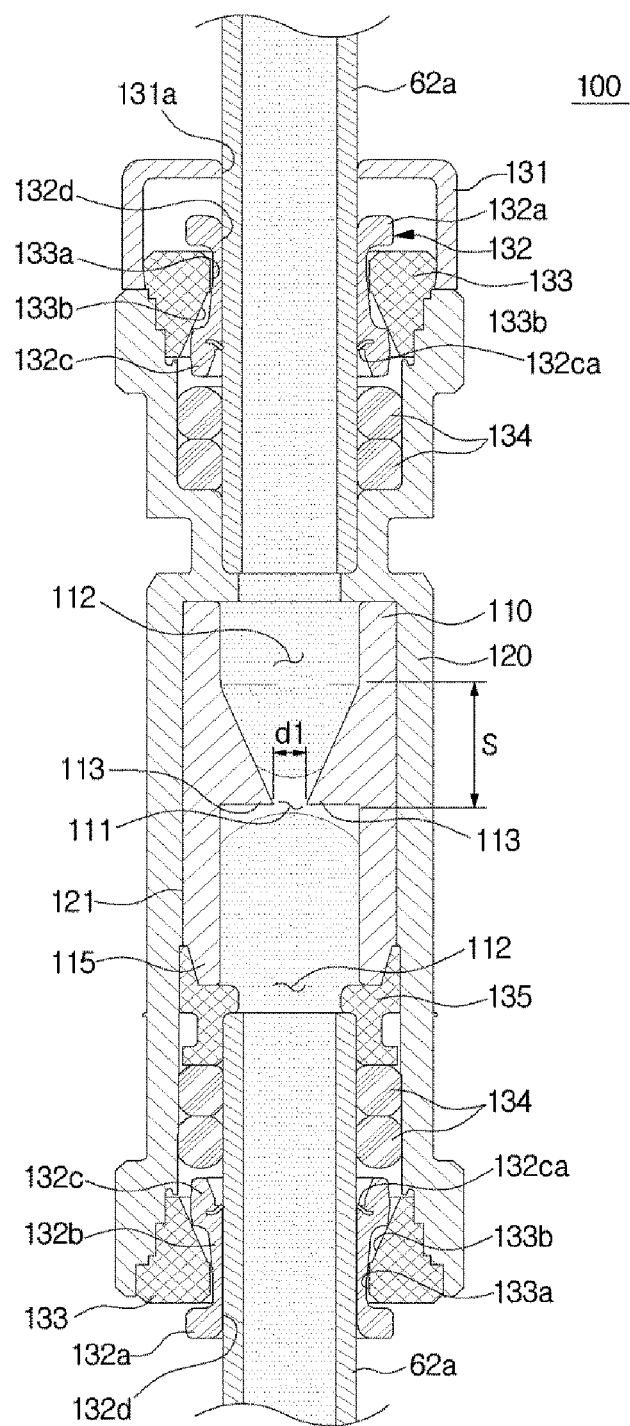
FIG. 7 is a cross-sectional view of the valve assembly shown in FIG. 4 when water supply to the valve assembly stops.

FIG. 4 shows a valve assembly of FIG. 3, FIG. 5 is an exploded perspective view of the valve assembly shown in FIG. 4, FIG. 6 is a cross-sectional view of the valve assembly shown in FIG. 4 when water is supplied to the valve assembly, and FIG. 7 is a cross-sectional view of the valve assembly shown in FIG. 4 when water supply to the valve assembly stops.

Referring to FIGS. 4 to 7, the valve assembly 100 may include an elastic member 110 having an outlet 111 whose diameter changes depending on whether or not water is supplied to the valve assembly 100, a protecting member 120 to accommodate the elastic member 110 therein, and a plurality of fixing members 130 respectively disposed at both ends of the protecting member 120 and configured to detachably connect a water supply pipe 62a of the water supply flow path 62 for the dispenser 90.

The elastic member 110 may be formed of a material having an elastic force (or a restoring force), and may be in the shape of a pipe to form a water channel 112 through which water flows. The elastic member 110 may include the outlet 111 whose diameter increases to a second diameter d2 when water flows by the water pressure of the external water source 40, and whose diameter decreases to a first diameter d1 when water supply from the external water source 40 stops. The second diameter d2 may need to have an appropriate size so that water can be smoothly supplied to the dispenser 90, and accordingly, the elastic member 110 may be formed of an appropriate material in consideration of this.

More specifically, the water channel 112 may have an area S whose diameter decreases along the flow direction of water. The cross-section of the area S may be in the shape of nearly a trapezoid. One end of the area S of the water channel 112, having the smallest diameter, is defined as the outlet 111.

The elastic member 110 may include an outlet forming portion 113 tapering gradually toward the center axis in the longitudinal direction of the elastic member 110 along the flow direction of the water. The outlet forming portion 113 may correspond to the area S of the water channel 112.

Referring to FIG. 6, when water flows by the water pressure of the external water source 40, the outlet forming portion 113 may expand in a direction away from the central axis along the longitudinal direction of the elastic member 110 by the water pressure. Accordingly, when water flows through the elastic member 110, the diameter of the outlet 111 may expand to the second diameter d2 so that water supplied from the external water source 40 can be smoothly supplied to the dispenser 90.

Meanwhile, referring to FIG. 7, when water supply from the external water source 40 stops, the outlet forming portion 113 may return to its original shape by the restoring force. Accordingly, when no water flows through the elastic member 110, the diameter of the outlet 111 may decrease to the first diameter d1 so that no water remaining in the water supply flow path 62 for the dispenser 90 is discharged to the outside through the dispenser 90.

Herein, the first diameter d1 may have a predetermined size not zero. The outlet 111 may open even when no water is supplied from the external water source 40. The outlet 111 may have the first diameter d1 at its normal state, and may expand by the water pressure of water supplied from the external water source 40 to have the second diameter d2. The size of the first diameter d1 can be set to a predetermined size that disallows water remaining in the valve assembly 100 to flow outside the valve assembly 100 due to the surface tension. More specifically, the size of the first diameter d1 can be decided according to the following equation.

$$L = \frac{F}{T}$$

Herein, F represents a force by which water remaining in the water supply flow path 62 for the dispenser 90 from the outlet 111 to the dispenser 90 is discharged, T represents the surface tension of water, and L represents the circumferential length of the outlet 111. The circumferential length of the outlet 111 may be decided to apply the minimum surface tension, in consideration of the force by which water remaining in the water supply flow path 62 for the dispenser 90 from the outlet 111 to the dispenser 90 is discharged and the surface tension of water, so that water remaining in the water supply flow path 62 for the dispenser 90 from the outlet 111 to the dispenser 90 can be kept in the inside of the water supply pipe 62a can be applied.

According to the configuration, when water is supplied from the external water source 40, the valve assembly 100 according to the embodiment of the present disclosure may change the shape of the outlet forming portion 113 to expand the diameter of the outlet 111 to the second diameter d2. As the diameter of the outlet 111 expands, the surface tension of water is reduced so that water can be smoothly supplied to the dispenser 90.

On the other hand, in the valve assembly 100 according to the embodiment of the present disclosure, when water supply from the external water source 40 stops, the outlet forming portion 113 may return to its original shape by the restoring force so that the diameter of the outlet 111 can be reduced to the first diameter d1. As the diameter of the outlet 111 decreases, the surface tension of water increases so that water existing in the water supply flow path 62 for the dispenser 90 from the outlet 111 to the dispenser 90 remains in the inside of the water supply pipe 62a without flowing outside the dispenser 90.

Also, the elastic member 110 may include an elastic member groove 114 coupled with a protecting member protrusion (not shown) formed on the inner surface of the protecting member 120 which will be described later, and fixing the elastic member 110 not to rotate inside the protecting member accommodating hole 121. The elastic member groove 114 may extend along the longitudinal direction of the elastic member 110. Also, a plurality of elastic member grooves 114 may be formed along the circumference of the outer surface of the elastic member 110. However, a method in which the elastic member 110 is fixed at the protecting member 120 is not limited to this, and for example, the elastic member 110 may be fixed at the protecting member 120 by a shrink-fit method.

The protecting member 120 may be in the shape of a pipe in which a protecting member accommodating hole 121 is formed, in order to accommodate the elastic member 110 therein. The protecting member 120 may be formed of a material having higher strength than the elastic member 110 to protect the elastic member 110.

The protecting member 120 may include a protecting member protrusion (not shown) formed on the inner surface of the protecting member accommodating hole 121, and coupled with the elastic member groove 114 to fix the elastic member 110 so that the elastic member 110 does not rotate.

A plurality of fixing members 130 may be disposed at both ends of the protecting member 120, and the water supply pipe 62a may be detachably connected to the fixing members 130. The fixing member 130 may include a fixing member cover 131, a holding member 132, a holding member guide 133, and an O-ring 134.

The fixing member cover 131 may be coupled with both ends of the protecting member 120, respectively, to cover the holding member 132, the holding member guide 133 and the O-ring 134 in the state that the holding member 132, the holding member guide 133 and the O-ring 134 are coupled with both ends of the protecting member 120, so that the holding member 132, the holding member guide 133, and the O-ring 134 are not exposed to the outside.

The fixing member cover 131 may include an insertion hole 131a into which the water supply pipe 62a is inserted.

The holding member 132 can selectively fix the water supply pipe 62a. The holding member 132 can be slidingly inserted into the insertion hole 133a of the holding member guide 133 which will be described later, and one end of the holding member 132 may include a separation preventing portion 132a having a larger diameter than the insertion portion 123b inserted into the holding member guide 133 to prevent the holding member 132 from escaping from the holding member guide 133, an insertion portion 132b to be inserted into the holding member guide 133, and a fixing portion 132c to selectively fixe the water supply pipe 62a.

The insertion hole 133a of the holding member guide 133 may have an entrance that is smaller than the circumferential size of the insertion portion 132b of the holding member 132. Therefore, as the holding member 132 is inserted into the holding member guide 133, the insertion portion 132b can be reduced radially inward to a predetermined size. For this purpose, the holding member 132 may include a material having predetermined elasticity.

More specifically, the holding member 132 may slide to a predetermined distance to be inserted into the insertion hole 133a of the holding member guide 133. The separation preventing portion 132a may be spaced a predetermined distance from the holding member guide 133. And in this state, the insertion portion 132b may be reduced radially inward to a predetermined size. Since the insertion portion 132b is reduced radially inward, the fixing portions 132c may also be reduced radially inward to a predetermined size so that the size of a hole formed inside the fixing portion 132c can decrease.

On the other hand, when the separation preventing portion 132a is pressed toward the holding member guide 133, the insertion portion 132b can spread to space secured by an inner inclined portion 133b of the insertion hole 133a by the restoring force. As the insertion portion 132b spreads, the fixing portion 132c can also spread radially outward so that the size of the hole formed inside the fixing portion 132c can increase.

According to the configuration, the fixing member 130 can detachably fix the water supply pipe 62a. More specifically, when coupling the water supply pipe 62a with the fixing member 130, the user may press the separation preventing portion 132a toward the holding member guide 133 to enlarge the size of the hole formed inside the fixing portion 132c so that the water supply pipe 62a can be smoothly inserted into the insertion hole 132d. After the water supply pipe 62a is inserted, the support member 132ca provided in the fixing portion 132c may support the water supply pipe 62a in the direction in which the water supply pipe 62a is coupled so that the water supply pipe 62a is not separated from the fixing member 130.

On the other hand, when separating the water supply pipe 62a from the fixing member 130, the user may again press the separation preventing portion 132a toward the holding member guide 133 to cause the fixing portion 132c to spread radially outward. As the fixing portion 132c spreads radially outward, the support member 132ca may be separated from the water supply pipe 62a while supporting the water supply pipe 62a no longer. In this state, the user can separate the water supply pipe 62a from the fixing member 130.

The holding member guide 133 may be coupled with both ends of the protecting member 120, respectively to guide the operation in which the fixed portion 132c of the holding member 132 spreads or is reduced.

The O-ring 134 may be disposed more inward inside the protecting member 120 than the holding member guide 133, and a plurality of O-rings 134 may be provided. Although two O-rings 134 are shown in this embodiment, the number of the O-rings 134 is not limited, and various numbers of O-rings may be provided as necessary.

The O-ring 134 may include a material having an elastic force to elastically compress and fix the water supply pipe 62a inserted in the protecting member 120, and to seal so that water flowing through the dispenser water supply flow path 62 does not leak out.

The configuration of the fixing member 130 as described above may be common to the fixing members 130 provided at both ends of the protecting member 120.

However, in the fixing member 130 provided on the downstream side (i.e. the side from which water is discharged) of the protecting member 120, the fixing member cover 131 is omitted, and the fixing member 130 may further include an elastic member supporting member 135. The elastic member supporting member 135 may receive one end 115 of the elastic member 110, and may support the elastic member 110 such that the elastic member 110 does not move to one side in the longitudinal direction.

According to the configuration, the valve assembly 100 according to the embodiment of the present disclosure, and the refrigerator 1 having the same can block water remaining in the water supply flow path 62 of the dispenser 90 without using separate signaling devices and input devices, when water is no longer supplied from the external water source 40, and when water is supplied from the external water source 40, the valve assembly 100 and the refrigerator 1 can supply the water smoothly to the dispenser 90.

In addition, the valve assembly 100 can control the flow of various kinds of liquids, as well as water.

Figure 8:
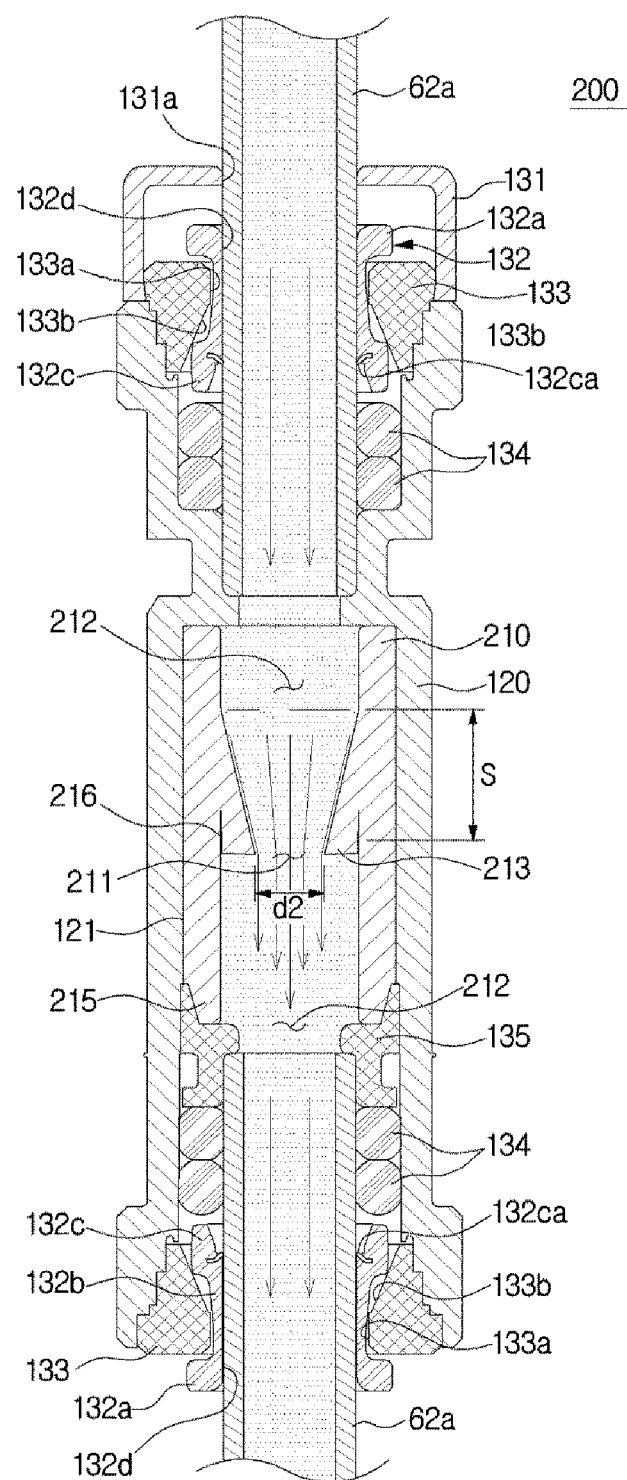
FIG. 8 is a cross-sectional view of a valve assembly according to another embodiment of the present disclosure when water is supplied to the valve assembly.
Figure 9:
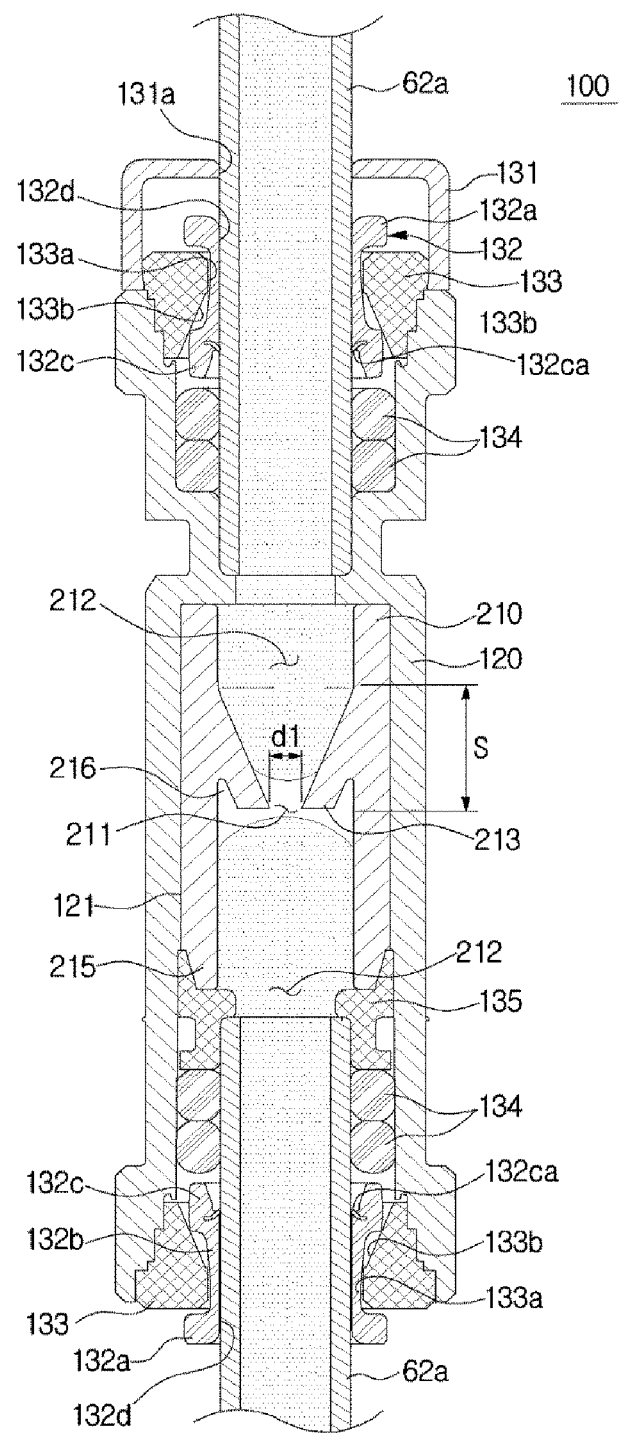
FIG. 9 is a cross-sectional view of the valve assembly shown in FIG. 8 when water supply to the valve assembly stops.

FIG. 8 is a cross-sectional view of a valve assembly according to another embodiment of the present disclosure when water is supplied to the valve assembly, and FIG. 9 is a cross-sectional view of the valve assembly shown in FIG. 8 when water supply to the valve assembly stops;

Referring to FIGS. 8 and 9, the valve assembly 200 according to another embodiment will be described. In the following description, the same component as those in the embodiment shown in FIGS. 4 to 7 will be denoted by the same reference numerals, and detailed descriptions thereof will be omitted.

Referring to FIGS. 8 and 9, the valve assembly 200 according to another embodiment may include a plurality of extension grooves 216 formed in the outlet forming portion 213.

Specifically, the extension grooves 216 may be formed at predetermined intervals along the circumference of the outlet 211 by partially cutting the outlet forming portion 213.

When water is supplied from the external water source 40, the water may flow through the water channel 212, and at this time, the extended grooves 216 may become space in which the outlet forming portion 213 can move in the direction of expanding the outlet 211. That is, unlike the embodiment shown in FIGS. 4 to 7, the current embodiment can facilitate the expansion of the outlet 211 by the outlet forming portion 213 through water pressure, when water is supplied from the external water source 40.

According to the configuration, when water is supplied from the external water source 40, the outlet forming portion 213 can be moved to the space formed by the expansion grooves 216 by the water pressure, to expand the outlet 211 to the second diameter d2. On the other hand, when water supply from the external water source 40 stops, the outlet forming portion 213 may move to its original position from the space formed by the expansion groove 216 by the restoring force to reduce the outlet 211 to the first diameter d1.

In addition, one end 215 of the elastic member 210 may be accommodated in the elastic member supporting member 135.

Figure 10:
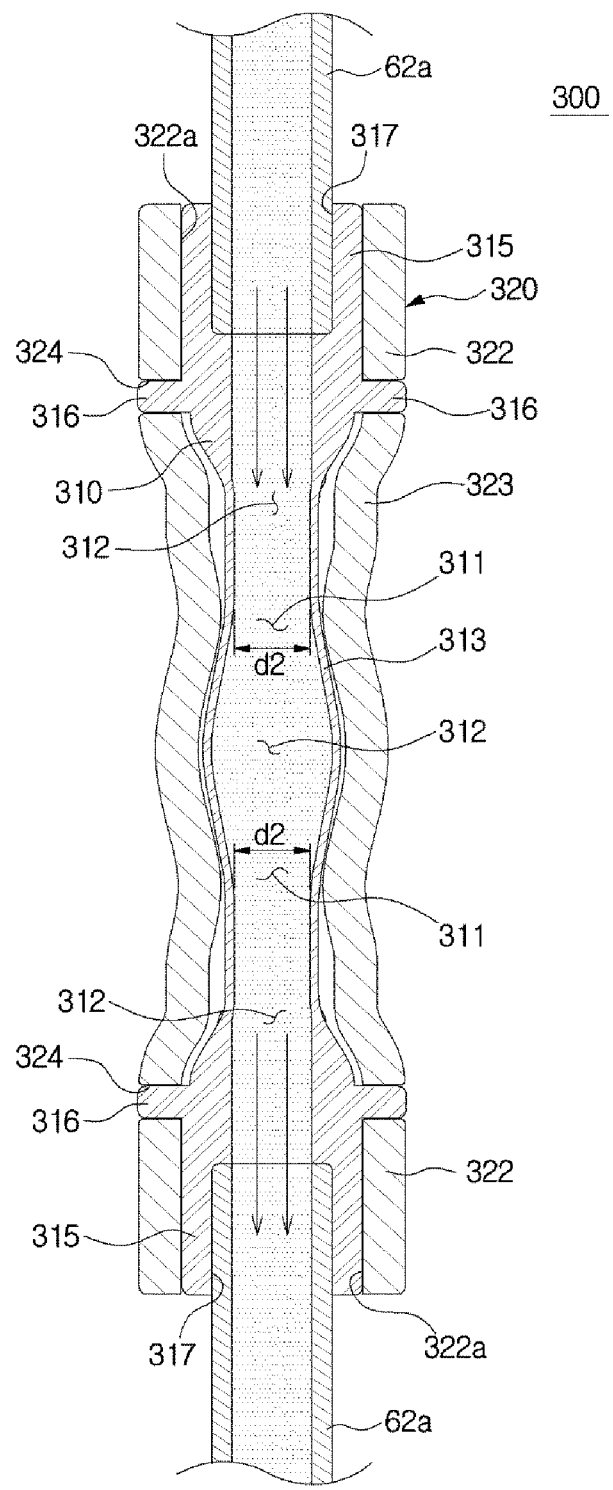
FIG. 10 is a cross-sectional view of a valve assembly according to another embodiment of the present disclosure when water is supplied to the valve assembly.
Figure 11:
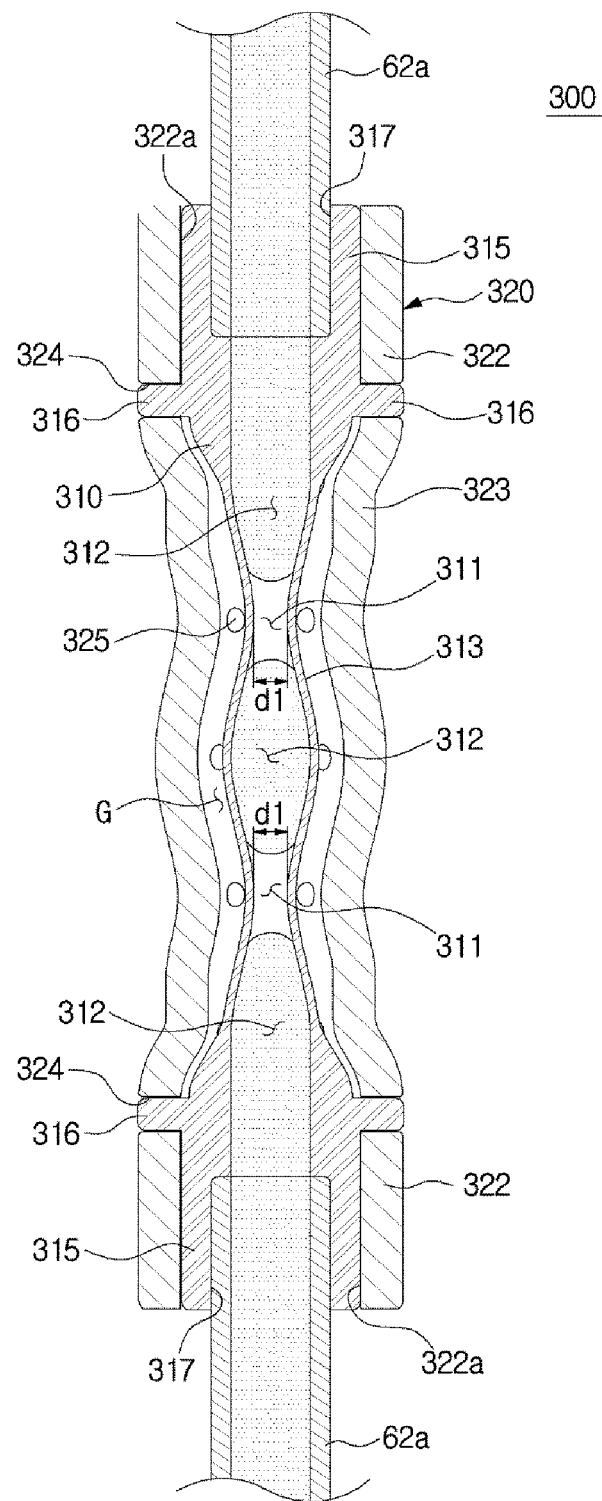
FIG. 11 is a cross-sectional of the valve assembly shown in FIG. 10 when water supply to the valve assembly stops.
Figure 12:
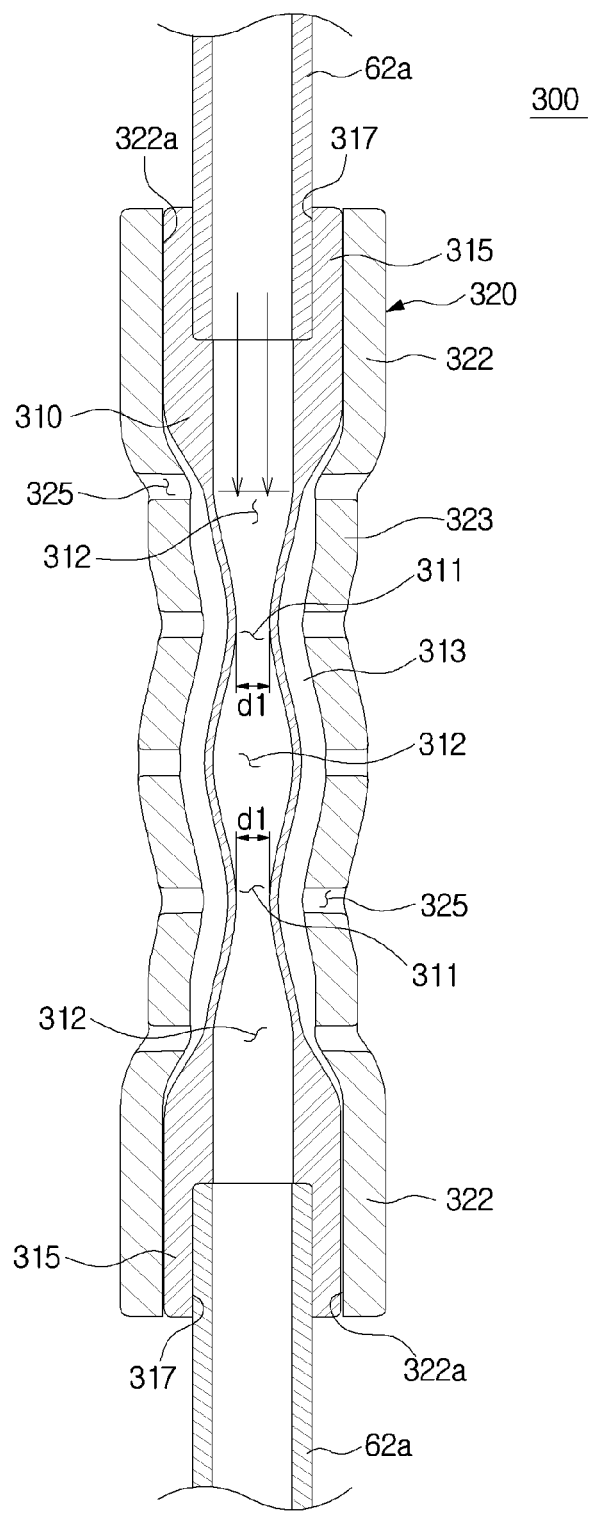
FIG. 12 is a cross-sectional view showing a through hole of the valve assembly shown in FIG. 10.

FIG. 10 is a cross-sectional view of a valve assembly according to another embodiment of the present disclosure when water is supplied to the valve assembly, FIG. 11 is a cross-sectional of the valve assembly shown in FIG. 10 when water supply to the valve assembly stops, and FIG. 12 is a cross-sectional view showing a through hole of the valve assembly shown in FIG. 10.

Referring to FIGS. 10 to 12, a valve assembly 300 according to another embodiment will be described. The same components as those in the embodiment shown in FIGS. 4 to 7 will be denoted by the same reference numerals, and detailed descriptions thereof will be omitted.

Referring to FIGS. 10 to 12, the valve assembly 300 may include an elastic member 310 and a protecting member 320.

The elastic member 310 may include a deforming portion 313 having an uneven shape to have two outlets 311, unlike the embodiment shown in FIGS. 4 to 7. When water is supplied from the external water source 40 so that water is supplied to the water channel 312 of the valve assembly 300, the deforming portion 313 may expand the outlet 311 to the second diameter d2 by water pressure. Also, when water supply from the external water source 40 stops, the deforming portion 313 may reduce the outlet 311 to the first diameter d1 by the restoring force. The first diameter d1 of the outlet 311 can be decided in consideration of the force of water to flow out of the valve assembly 300 and the surface tension of water as described above.

The elastic member 310 may be provided at both ends of the deformation portion 313, and may include an insertion portion 315 which is inserted into and fixed at the fixing portion 322 of the protecting member 320. More specifically, the insertion portion 315 can be inserted into the insertion portion accommodating hole 322a of the fixing portion 322 to be accommodated in the inside of the protecting member 320.

The elastic member 310 may include a fixing protrusion 316 inserted into the fixing groove 324 of the protecting member 320 to restrict movement in longitudinal direction of the elastic member 310. The fixing protrusion 316 may be formed between the deforming portion 313 and the insertion portion 315, and may protrude radially outward from the elastic member 310 to a predetermined length. The fixing protrusions 316 may be continuously or partially formed along the circumferential surface of the elastic member 310.

The elastic member 310 may be formed in the insertion portion 315, and may include a water supply pipe hole 317 into which the water supply pipe 62a of the water supply flow path 62 for the dispenser 90 is inserted.

The protecting member 320 may include a fixing portion 322 which the insertion portion 315 of the elastic member 310 is inserted into and fixed at, and a deforming portion accommodating portion 323 for accommodating the deforming portion 313 of the elastic member 310.

The fixing portion 322 may include an insertion portion accommodating hole 322a to accommodate the insertion portion 315 therein.

The deforming portion accommodating portion 323 may have an uneven shape that is nearly similar to the uneven shape of the deforming portion 313 of the elastic member 310. That is, the deforming portion accommodating portion 323 may be formed to be nearly similar to the shape formed when the deforming portion 313 of the elastic member 310 expands by the water pressure of water provided from the external water supply source 40.

By the configuration, an air gap G may be formed between the deforming portion 313 of the elastic member 310 and the deforming portion accommodating portion 323 of the protecting member 310. The deforming portion 313 of the elastic member 310 can be extended or reduced radially outward from the elastic member 310 through the air gap G, thereby expanding or reducing the outlet 311.

Also, in the deforming portion accommodating portion 323 of the protecting member 320, a through hole 325 may be formed to penetrate the outside and the inside of the protecting member 320. The through hole 325 can supply air to the air gap G to prevent dew from being formed in the air gap G.

Figure 13:
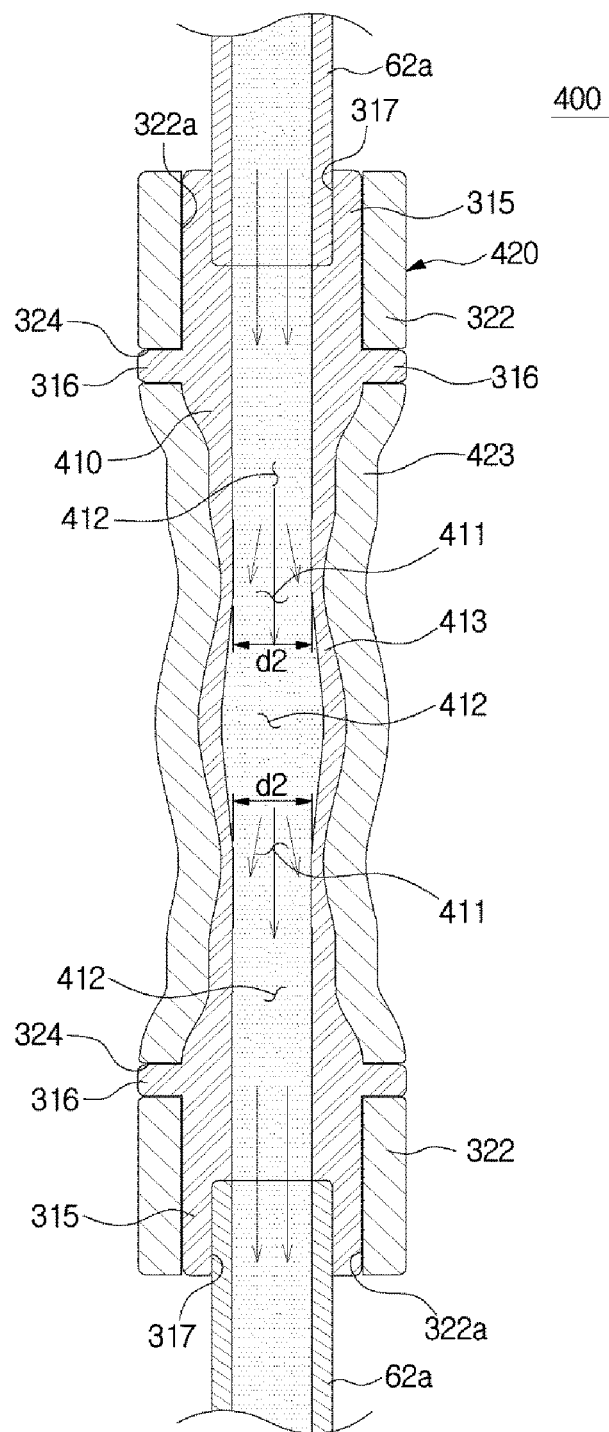
FIG. 13 is a cross-sectional view of a valve assembly according to another embodiment of the present disclosure when water is supplied to the valve assembly.
Figure 14:
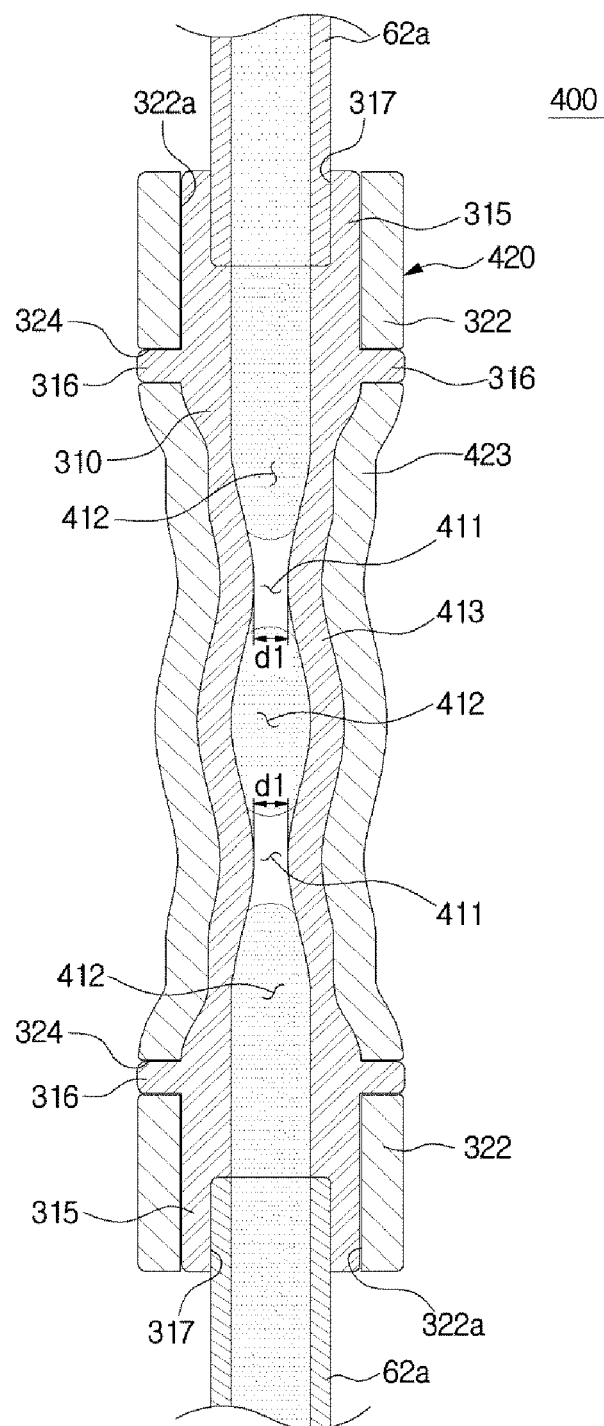
FIG. 14 is a cross-sectional view of the valve assembly shown in FIG. 13 when water supply to the valve assembly stops.

FIG. 13 is a cross-sectional view of a valve assembly according to another embodiment of the present disclosure when water is supplied to the valve assembly, and FIG. 14 is a cross-sectional view of the valve assembly shown in FIG. 13 when water supply to the valve assembly stops.

Referring to FIGS. 13 and 14, a valve assembly 400 according to another embodiment will be described. The same components as those in the embodiment shown in FIGS. 10 to 12 will be denoted by the same reference numerals, and detailed descriptions thereof may be omitted.

Referring to FIGS. 13 and 14, unlike the valve assembly 300 shown in FIGS. 10 to 12, the valve assembly 400 according to the current embodiment may be provided such that the outer surface of a deforming portion 413 of an elastic member 410 is in contact with the inner surface of the deforming portion accommodating portion 323 of the protecting member 320. That is, due to the water pressure of water supplied from the external water source 40, the elastic member 410 may be thinned and stretch to expand the outlet 411 . . . . For this, the elastic member 410 according to the current embodiment may be formed of a material having higher ductility than the elastic member 310 shown in FIGS. 10 to 12.

When water supply from the external water source 40 stops so that no water remains in the water channel 412, the elastic member 410 may be restored to its original state, that is, the thickness of the elastic member 410 may be thickened again to reduce the outlet 411.

Figure 15:
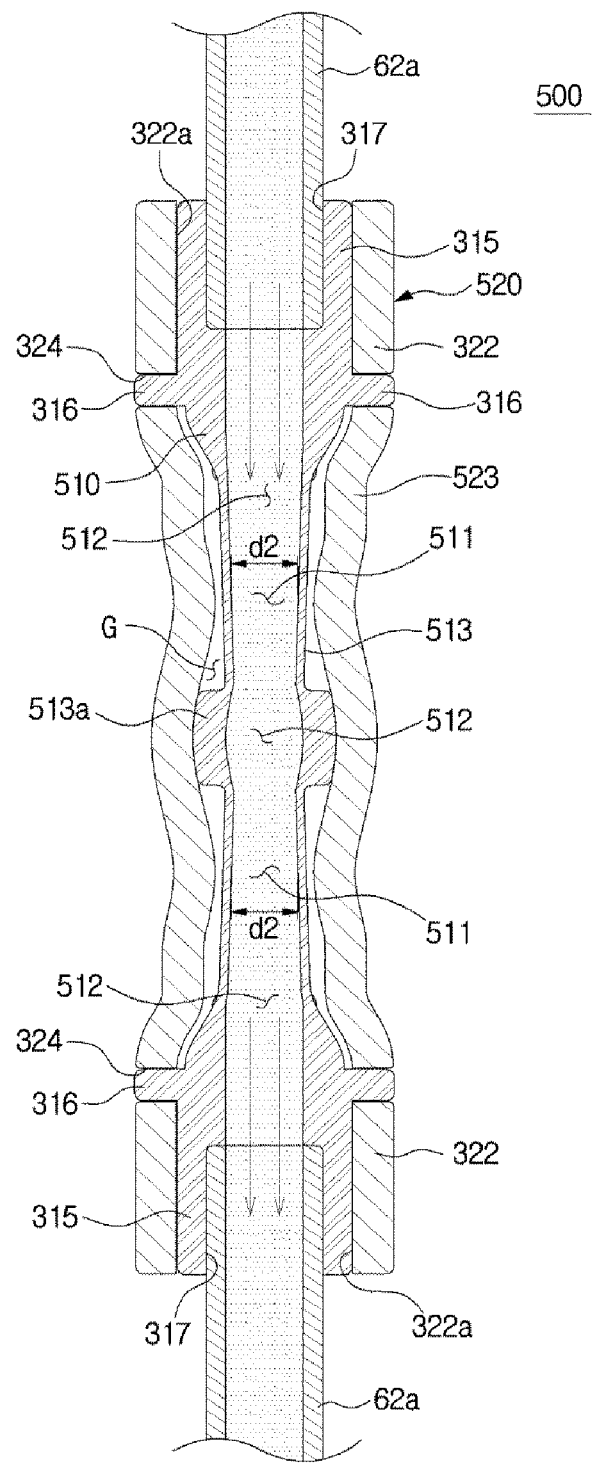
FIG. 15 is a cross-sectional view of a valve assembly according to another embodiment of the present disclosure when water is supplied to the valve assembly.
Figure 16:
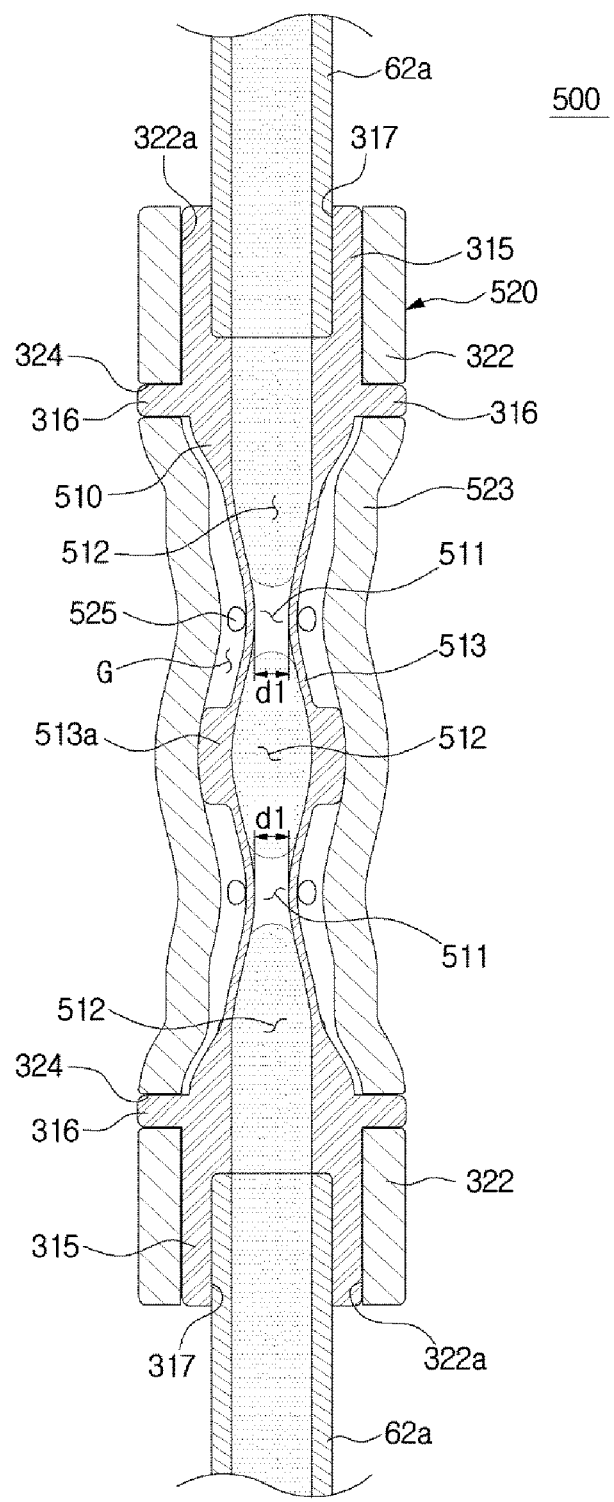
FIG. 16 is a cross-sectional view of the valve assembly shown in FIG. 15 when water supply to the valve assembly stops.
Figure 17:
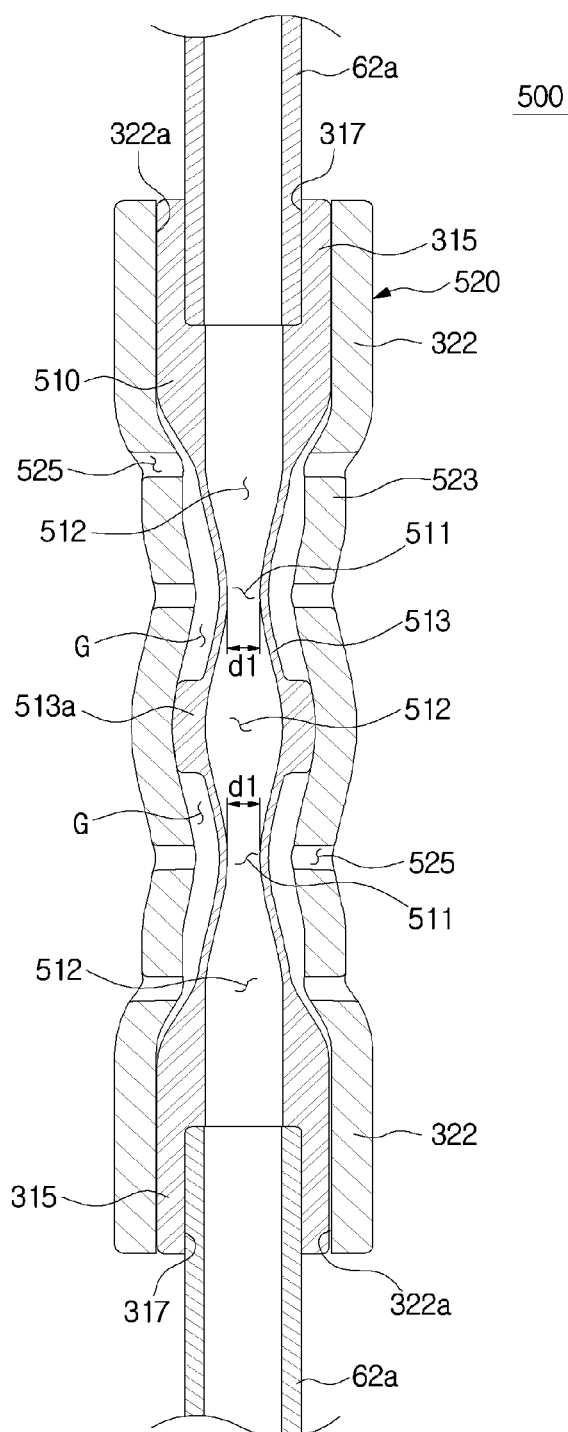
FIG. 17 is a cross-sectional view showing a through hole of the valve assembly shown in FIG. 15.

FIG. 15 is a cross-sectional view of a valve assembly according to another embodiment of the present disclosure when water is supplied to the valve assembly, FIG. 16 is a cross-sectional view of the valve assembly shown in FIG. 15 when water supply to the valve assembly stops, and FIG. 17 is a cross-sectional view showing a through hole of the valve assembly shown in FIG. 15.

Referring to FIGS. 15 to 17, a valve assembly 500 according to another embodiment will be described. The same components as those in the embodiment shown in FIGS. 10 to 12 will be denoted by the same reference numerals, and detailed descriptions thereof will be omitted.

Referring to FIGS. 15 to 17, unlike the valve assembly 300 shown in FIGS. 10 to 12, the valve assembly 500 according to the current embodiment may include a supporting portion 513a protruding radially outward from the elastic member 510 in a deforming portion 513. The supporting portion 513a may be formed in a nearly central portion of the deforming portion 513, and may be formed in the shape of a protrusion on the entire or a part of the deforming portion 513 along the circumference of the deforming portion 513. Therefore, the supporting portion 513a according to the current embodiment can be regarded as the supporting projection 513a.

When water supply from the external water supply source 40 stops so that the deforming portion 513 is restored, the supporting protrusion 513a may support the restoration of the deformed portions 513. That is, when water is supplied from the external water source 40 so that the deforming portion 513 expands by the water pressure of water flowing through a water channel 512, the supporting protrusion 513a of the elastic member 510 according to the current embodiment may support a part of the deforming portion 513 in the radial direction of the elastic member 510 to restrict the expansion of the deforming portion 513. Therefore, the supporting protrusion 513a may be formed in a portion of the deforming portion 513 where the diameter of the channel 512 is greatest.

According to the configuration, in the valve assembly 500 of the current embodiment, the deforming portion 513 may expand to so that the outlet 511 has the second diameter d2 when water is supplied from the external water source 40, and at this time, the deforming portion 513 may expand around the outlet 511, and may not expand around the supporting protrusion 513a.

Thereafter, when water supply from the external water source 40 stops, in the valve assembly 500, the deforming portion 513 may be reduced so that the outlet 511 has the first diameter d1, and, at this time, the peripheral portion of the outlet 511 of the deforming portion 513 can be more easily restored by the supporting protrusion 513a.

The protecting member 520 may include a through hole 525 formed in the deforming portion accommodating portion 523. The through hole 525 can supply air to an air gap G formed between the deforming portion 513 and the deforming portion accommodating portion 523 to prevent dew from forming in the air gap G.

Figure 18:
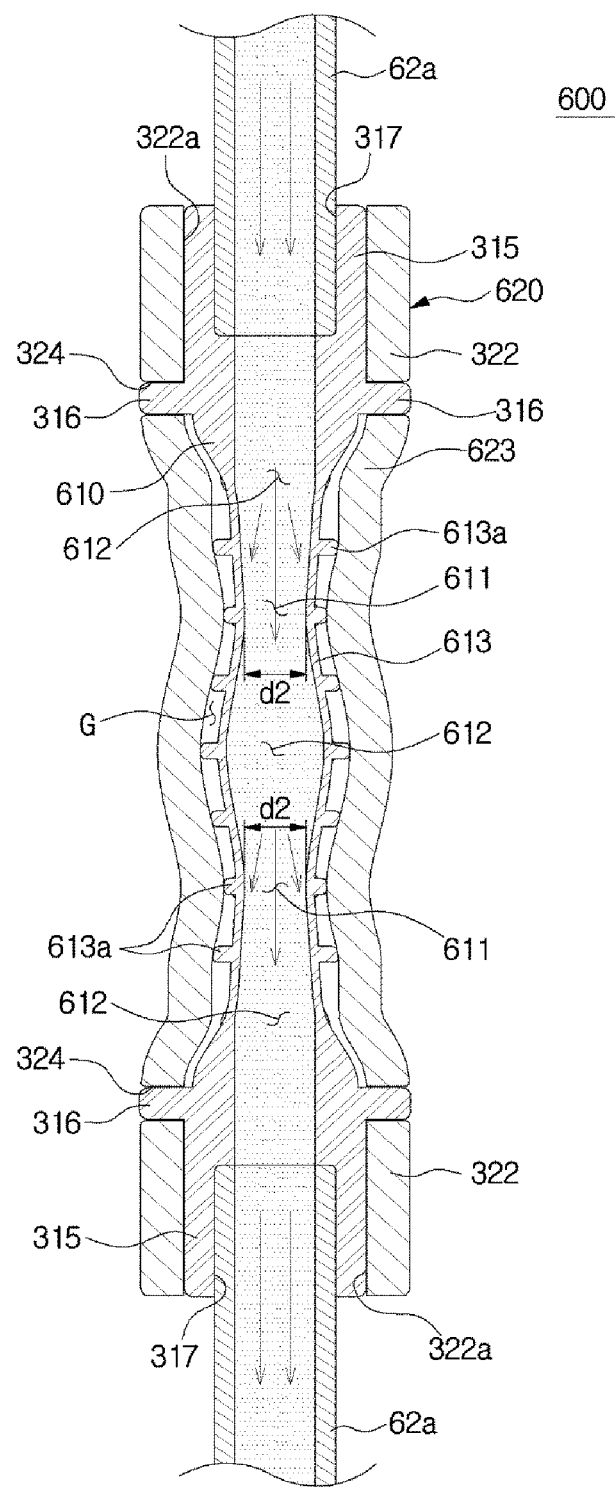
FIG. 18 is a cross-sectional view of a valve assembly according to another embodiment of the present disclosure when water is supplied to the valve assembly.
Figure 19:
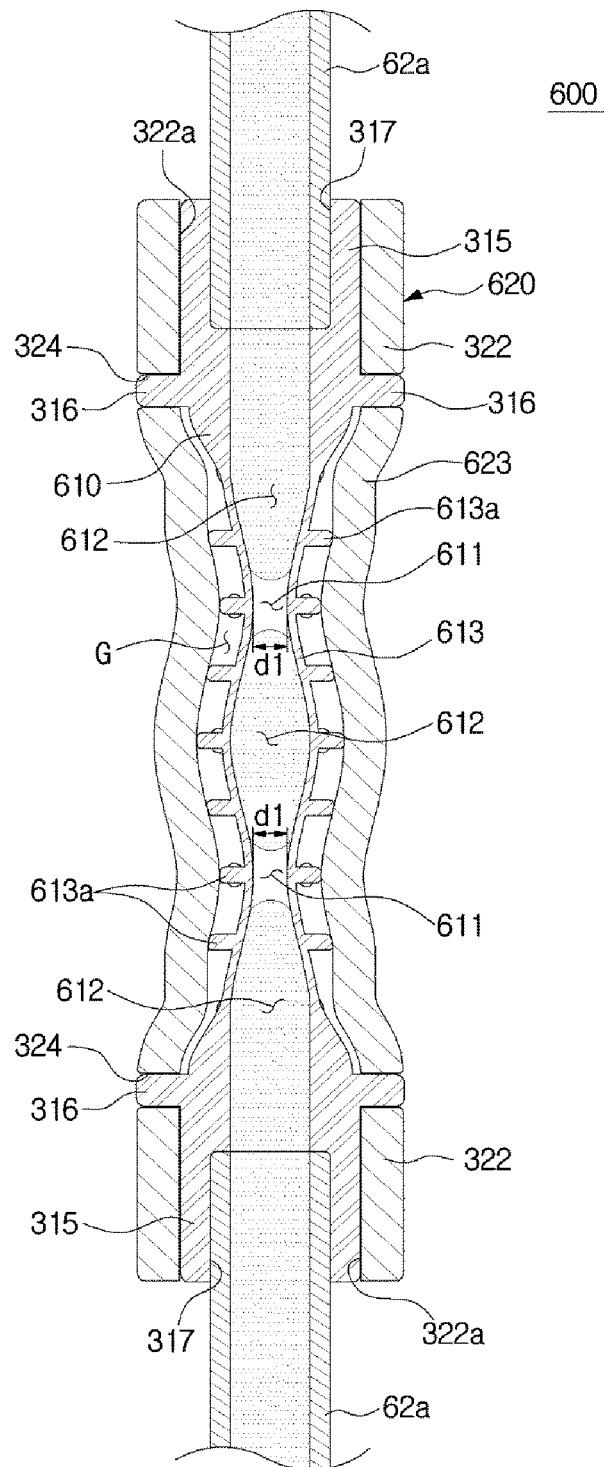
FIG. 19 is a cross-sectional view of the valve assembly shown in FIG. 18 when water supply to the valve assembly stops.
Figure 20:
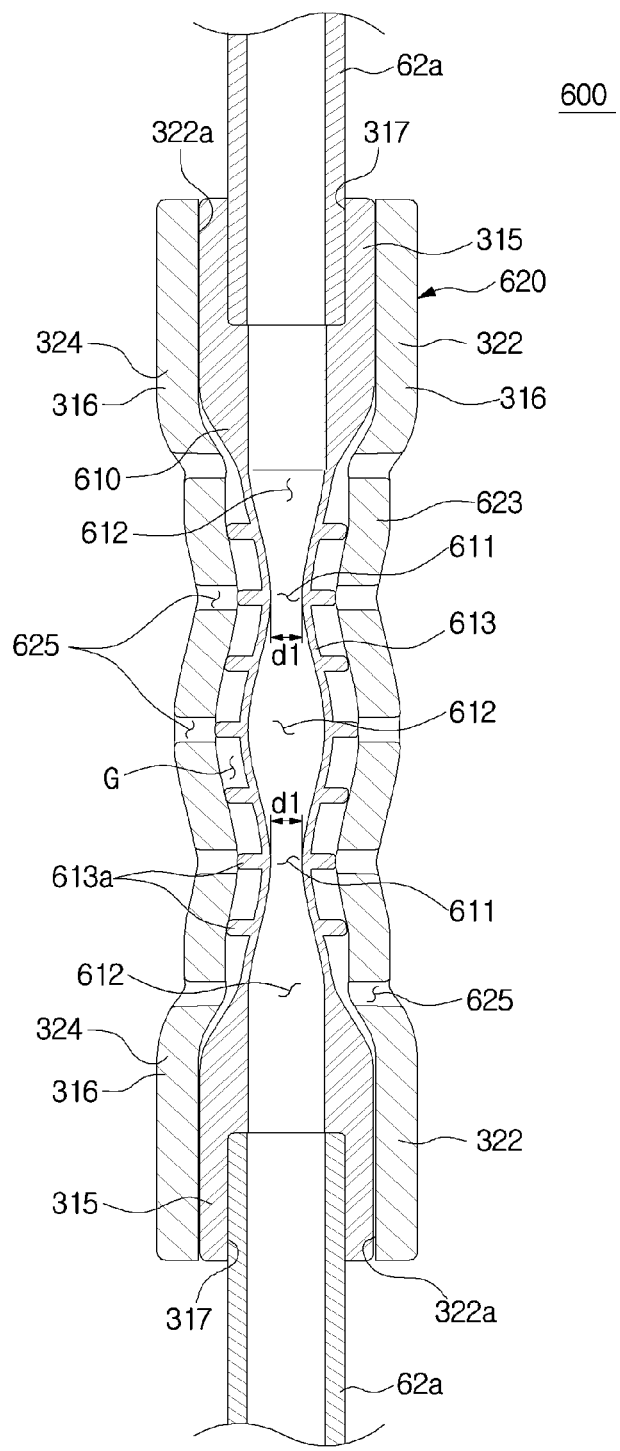
FIG. 20 is a cross-sectional view showing a through hole of the valve assembly shown in FIG. 18.

FIG. 18 is a cross-sectional view of a valve assembly according to another embodiment of the present disclosure when water is supplied to the valve assembly, FIG. 19 is a cross-sectional view of the valve assembly shown in FIG. 18 when water supply to the valve assembly stops, and FIG. 20 is a cross-sectional view showing a through hole of the valve assembly shown in FIG. 18;

Referring to FIGS. 18 to 20, a valve assembly 600 according to another embodiment will be described. The same components as those in the embodiment shown in FIGS. 10 to 12 will be denoted by the same reference numerals, and detailed descriptions thereof will be omitted.

Referring to FIGS. 18 to 20, unlike the valve assembly 300 shown in FIGS. 10 to 12, a valve assembly 600 according to the current embodiment may include a supporting portion 613a protruding radially outward from an elastic member 610 in a deforming portion 613. Unlike the supporting portion 513a shown in FIGS. 15 to 17, according to the current embodiment, a plurality of supporting portions 613a may be provided along the longitudinal direction of the deformation portion 613, and may be formed in the shape of protrusions on the entire or a part of the deforming portion 613 along the circumference of the deforming portion 613. Therefore, the supporting portion 613a according to the current embodiment can be regarded as a plurality of supporting protrusions 613a.

When water supply from the external water source 40 stops so that the deforming portion 613 is restored, the plurality of supporting protrusions 613a can support the restoration of the deformed portion 613. That is, when water is supplied from the external water source so that the deforming portion 613 expands by the water pressure of water flowing in the water channel 612, the supporting protrusion 613a of the elastic member 610 according to the current embodiment may support a part of the deforming portion 613 in the radial direction of the elastic member 610 to restrict the expansion of the deforming portion 613.

According to the configuration, in the valve assembly 600 according to the current embodiment, when water is supplied from the external power source 40, the deforming portion 613 may expand so that the outlet 611 has the second diameter d2, and when water supply from the external source 40 stops, the deforming portion 613 may be reduced so that the outlet 611 has the first diameter d1. At this time, the deforming portion 613 can be more easily restored by the support protrusion 613a.

The protecting member 620 may include a through hole 625 formed in a deforming portion accommodating portion 623. The through hole 625 may supply air to an air gap G formed between the deforming portion 613 and the deforming portion accommodating portion 623 to prevent dew from forming in the air gap G.

Figure 21:
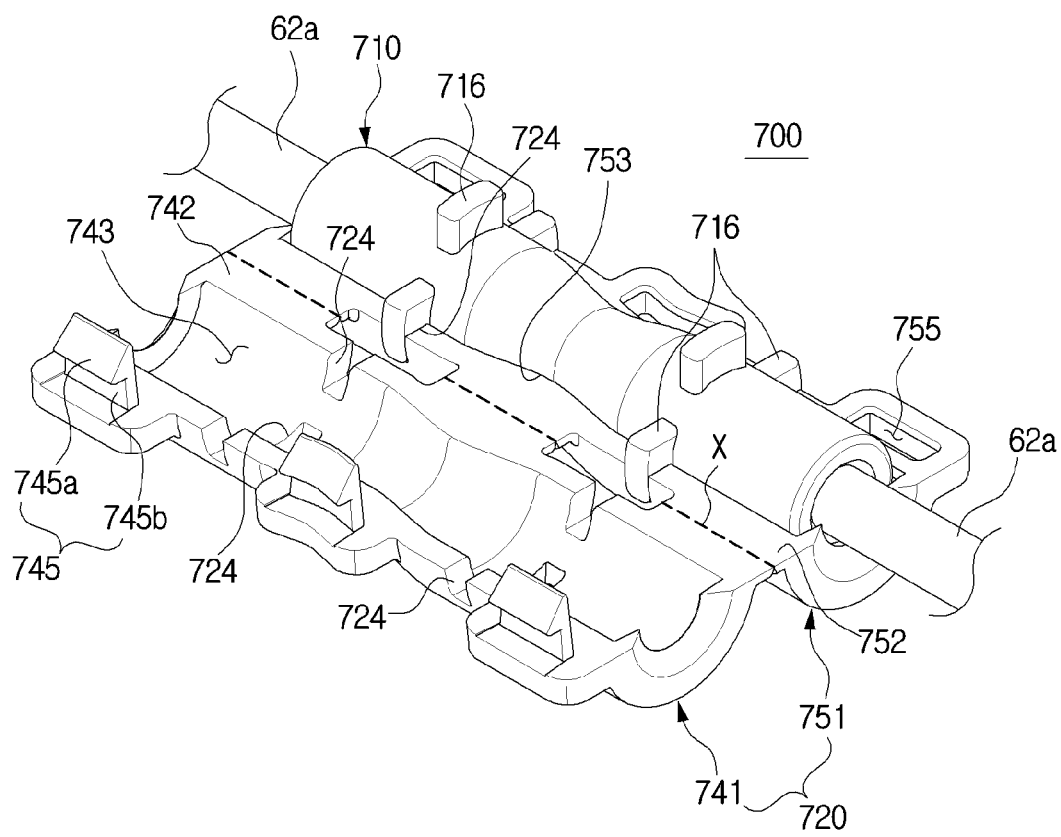
FIG. 21 is a perspective view of a valve assembly according to another embodiment of the present disclosure before a protecting member is coupled.
Figure 22:
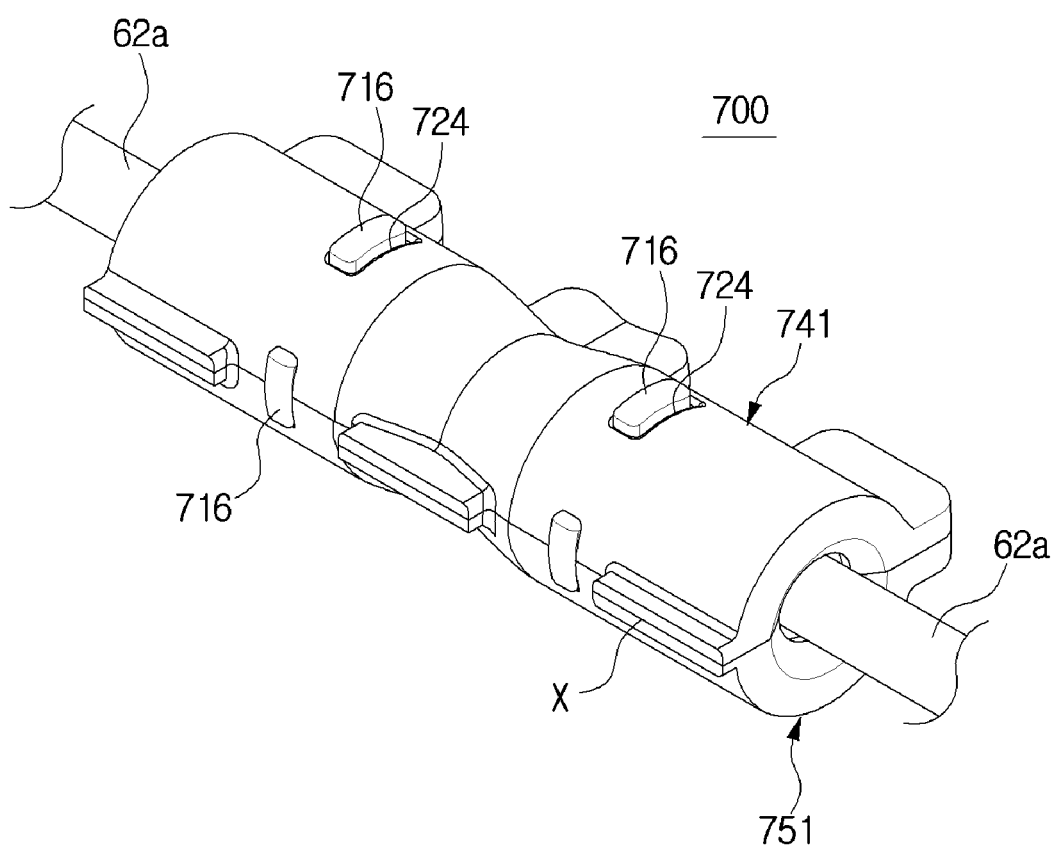
FIG. 22 is a perspective view of the valve assembly shown in FIG. 21 after the protecting member is coupled.

FIG. 21 is a perspective view of a valve assembly according to another embodiment of the present disclosure before a protecting member is coupled, and FIG. 22 is a perspective view of the valve assembly shown in FIG. 21 after the protecting member is coupled.

Referring to FIGS. 21 and 22, a valve assembly 700 according to another embodiment of the present disclosure will be described. The same components as those in the above-described embodiments will be denoted by the same reference numerals, and detailed descriptions thereof will be omitted.

Referring to FIGS. 21 and 22, a protecting member 720 of the valve apparatus 700 may include a first protecting member 741 and a second protecting member 751.

One end 742 of the first protecting member 741 may be rotatable with respect to one end 752 of the second protecting member 751. The end 742 of the first protecting member 741 may be hinge-coupled with the end 752 of the second protecting member 751. However, the end 742 of the first protecting member 741 may be folded with the end 752 of the second protecting member 751 along a rotation shaft X.

The first protecting member 741 may include a first accommodating groove 743 to accommodate a portion of the elastic member 710 therein. More specifically, the first accommodating groove 743 may accommodate approximately half of the elastic member 710.

The second protecting member 751 may include a second accommodating groove 753 to accommodate the remaining portion of the elastic member 710 therein. More specifically, the second accommodating groove 753 may accommodate the approximately remaining half of the elastic member 710 therein.

The first protecting member 741 may include a coupling protrusion 745 protruding from the other end 744 that is opposite to the end 742 so as to be coupled with a coupling recess 755 which will be described later in a snap-fit manner. The coupling protrusion 745 may include a catching portion 745a caught by the engaging groove 755, and an elastic portion 745b configured to be deformable with predetermined elasticity so that the catching portion 745a can pass through the coupling groove 755.

The second protecting member 751 may include a coupling groove 755 with which the coupling protrusion 745 is coupled, at the other end 754 that is opposite to the one end 752.

The number of the coupling projection 745 may correspond to the number of the coupling groove 755. In FIGS. 21 and 22, three coupling protrusions 745 and three coupling grooves 755 are provided, however, the numbers of the coupling protrusions 745 and the coupling grooves 755 are not limited. That is, various numbers of the coupling protrusions 745 and the coupling grooves 755 may be provided as necessary.

According to the configuration, the valve assembly 700 according to the current embodiment can connect the water supply pipe 62a to the elastic member 710, accommodate them in the protecting member 720, and then easily fix them.

More specifically, the user can connect the water pipe 62a to both ends of the elastic member 710, and then rest them in the second accommodating groove 763 of the second protecting member 751. Thereafter, the user may rotate the first protecting member 741 along the rotation axis X to insert the coupling protrusion 745 into the coupling groove 755 so as to couple the first protecting member 741 with the second protecting member 751. At this time, a plurality of fixing protrusions 716 of the elastic member 710 may be respectively inserted into the fixing grooves 724 of the protecting member 720, and fixed at the inside of the protecting member 720.

Accordingly, the first protecting member 741 may be fixed at the second protection member 751 in a state of being in close contact with the second protecting member 751, so that the elastic member 710 and the water supply pipe 62a can be fixed while being pressed between the first protection member 741 and the second protecting member 751.

Since the valve assembly 700 according to the current embodiment has a relatively simple structure, the assembling efficiency and productivity can be improved.

Figure 23:
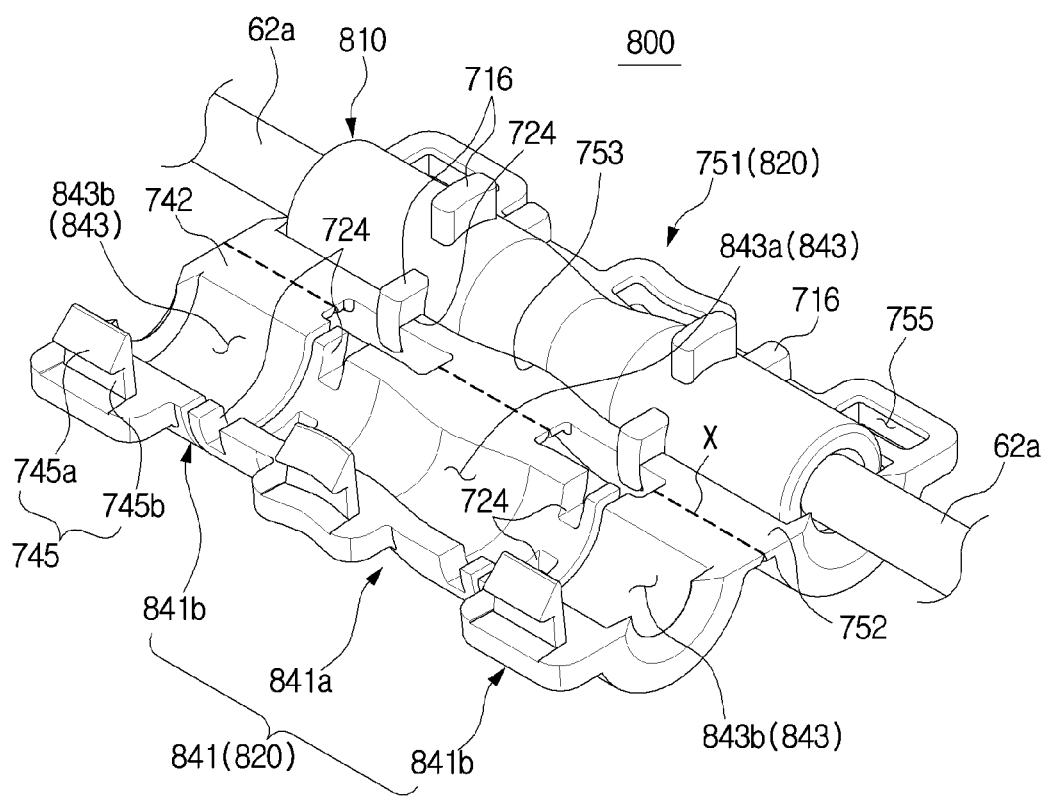
FIG. 23 is a perspective view of a valve assembly according to another embodiment of the present disclosure before a protecting member is coupled.
Figure 24:
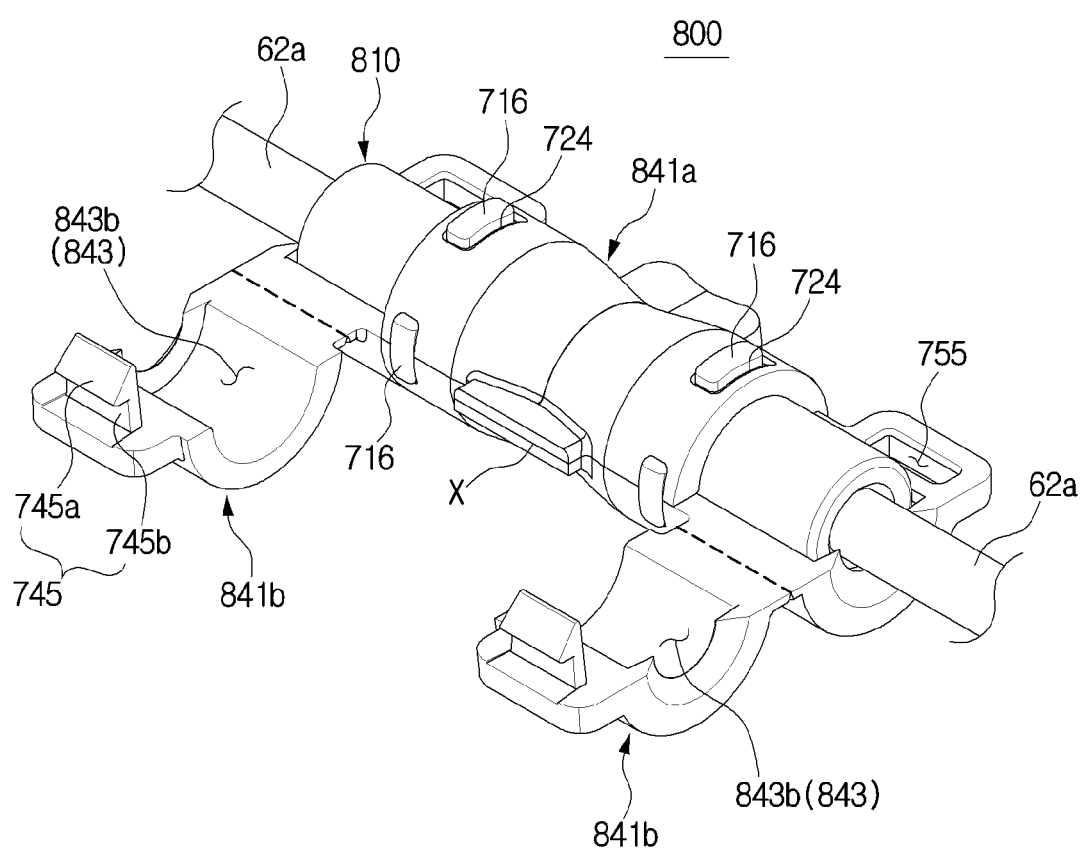
FIG. 24 is a perspective view of the valve assembly shown in FIG. 23 after an elastic member accommodating portion of the protecting member is coupled.

FIG. 23 is a perspective view of a valve assembly according to another embodiment of the present disclosure before a protecting member is coupled, and FIG. 24 is a perspective view of the valve assembly shown in FIG. 23 after an elastic member accommodating portion of the protecting member is coupled.

Referring to FIGS. 23 and 24, a valve assembly 800 according to another embodiment of the present disclosure will be described. The same components as those in the embodiment shown in FIGS. 21 and 22 will be denoted by the same reference numerals, and detailed descriptions thereof will be omitted.

Referring to FIGS. 23 and 24, a valve assembly 800 according to another embodiment of the present disclosure may include an elastic member fixing portion 841a to enable a first protecting member 841 to accommodate a portion of the elastic member 810, and a plurality of water supply pipe fixing portions 841b respectively provided on both sides of the elastic member fixing portion 841a to accommodate the water supply pipe 62a and the remaining portion of the elastic member 810.

Unlike the embodiment shown in FIGS. 21 and 22, in the valve assembly 800 according to the current embodiment, the first protecting member may be divided into the elastic member fixing portion 841a and the water supply pipe fixing portion 841b. The elastic member fixing portion 841a may include a center accommodating groove 843a, and the water supply pipe fixing portion 841b may include end accommodating grooves 843b.

Accordingly, the user may fix the center of the elastic member 810 through the elastic member fixing portion 841a, and then connect the water supply pipe 62a to both ends of the elastic member 810 to fix them through the water supply pipe fixing portion 841b. That is, the elastic member fixing portion 841a may be rotatable independently from the water supply pipe fixing portion 841b with respect to the second protecting member 751.

According to the technical concept of the present disclosure, the valve assembly and the refrigerator having the same can reduce the number of components through a relatively simple configuration, thereby reducing manufacturing cost.

Also, according to the technical concept of the present disclosure, the valve assembly and the refrigerator having the same can automatically adjust the size of the outlet by the pressure of water supplied from an external water source using an elastic force (or a restoring force) of an elastic member, thereby blocking water remaining in the inside of the water supply flow path for the dispenser through a simple method.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A refrigerator, comprising:
a main body;
a dispenser configured to supply water to an outside of the main body;
a water supply flow path connectable to a water source and configured to connect the dispenser to the water source; and
a valve assembly disposed on the water supply flow path, the valve assembly including an elastic member having an outlet with an inner diameter reducible by an elastic force of the elastic member, when water is not supplied to the valve assembly, so that water remaining in the inside of the water supply flow path is retained by a surface tension of the water,
wherein the valve assembly further comprises a protecting member configured to accommodate the elastic member in the protecting member,
wherein the elastic member is disposed to form an air gap between the elastic member and the protecting member, the elastic member comprising a supporting portion protruding toward the protecting member,
wherein the supporting portion comprises a supporting protrusion formed at a central portion of the elastic member.

2. The refrigerator of claim 1, wherein the protecting member comprises a through hole penetrating an inside and an outside of the protecting member.

3. The refrigerator of claim 1, wherein the supporting portion comprises a plurality of supporting protrusions disposed along a longitudinal direction of the elastic member.

4. The refrigerator of claim 1, wherein:
the elastic member comprises a fixing protrusion protruding radially outward from an outer circumferential surface of the elastic member,
the protecting member comprises a fixing groove in which the fixing protrusion is insertable.

5. The refrigerator of claim 1, wherein the protecting member includes:
a first protecting member having a first accommodating groove configured to accommodate one portion of the elastic member therein, and
a second protecting member having a second accommodating groove rotatably provided on one side of the first protecting member along a longitudinal direction of the first protecting member, and configured to accommodate a remaining portion of the elastic member therein.

6. The refrigerator of claim 5, wherein:
the first protecting member comprises a coupling protrusion protruding from another side that is opposite to the one side connected to the second protecting member, and
the second protecting member comprises a coupling groove coupled with the coupling protrusion in a snap-fit manner, at the other side that is opposite to the one side connected to the first protecting member.

7. The refrigerator of claim 5, wherein the first protecting member includes:
an elastic member fixing portion configured to accommodate a portion of the elastic member therein; and
a water supply pipe fixing portion provided on both sides of the elastic member fixing portion, and configured to accommodate a water supply pipe connected to both ends of the valve assembly and the remaining portion of the elastic member,
wherein elastic member fixing portion is rotatable independently from the water pipe fixing portion with respect to the second protecting member.

\* \* \* \* \*